United States Patent [19]

Yamada

[11] Patent Number: 5,625,445
[45] Date of Patent: Apr. 29, 1997

[54] COLOR IMAGE FORMING APPARATUS HAVING MEANS FOR DETERMINING THE NUMBER OF TRANSFER MEMBERS SUPPORTED ON THE TRANSFER MEMBER RETAINING MEANS

[75] Inventor: Masanori Yamada, Kawasaki, Japan

[73] Assignee: Canon Kabushiki Kaisha, Tokyo, Japan

[21] Appl. No.: 569,863

[22] Filed: Dec. 8, 1995

Related U.S. Application Data

[60] Continuation of Ser. No. 310,332, Sep. 22, 1994, abandoned, which is a division of Ser. No. 891,206, Jun. 1, 1992, Pat. No. 5,383,012.

[30] Foreign Application Priority Data

Jun. 3, 1991 [JP] Japan .................................. 3-131204

[51] Int. Cl.⁶ .............................................. G03G 15/01
[52] U.S. Cl. ..................... 399/54; 347/232; 358/500
[58] Field of Search ............................ 355/327, 326 R, 355/271; 347/232; 358/500, 517, 518, 519, 400

[56] References Cited

U.S. PATENT DOCUMENTS

| | | | |
|---|---|---|---|
| 4,998,216 | 3/1991 | Hino et al. | 364/519 |
| 5,065,233 | 11/1991 | Oka | 355/326 |
| 5,081,488 | 1/1992 | Suzuki | 355/271 X |
| 5,086,318 | 2/1992 | Takeda et al. | 355/271 |
| 5,121,163 | 6/1992 | Muramatsu et al. | 355/246 |
| 5,335,056 | 8/1994 | Muramatsu | 355/327 |

*Primary Examiner*—R. L. Moses
*Attorney, Agent, or Firm*—Fitzpatrick, Cella, Harper & Scinto

[57] ABSTRACT

A color forming image apparatus for forming a multicolor image by forming an image of each color including a transfer member holder for retaining a plurality of transfer members. The image former forms the image on the transfer member based on an image signal from an external source. A detector detects information relating to a status of the transfer member held in the transfer member holder and sends the information to the external source.

39 Claims, 21 Drawing Sheets

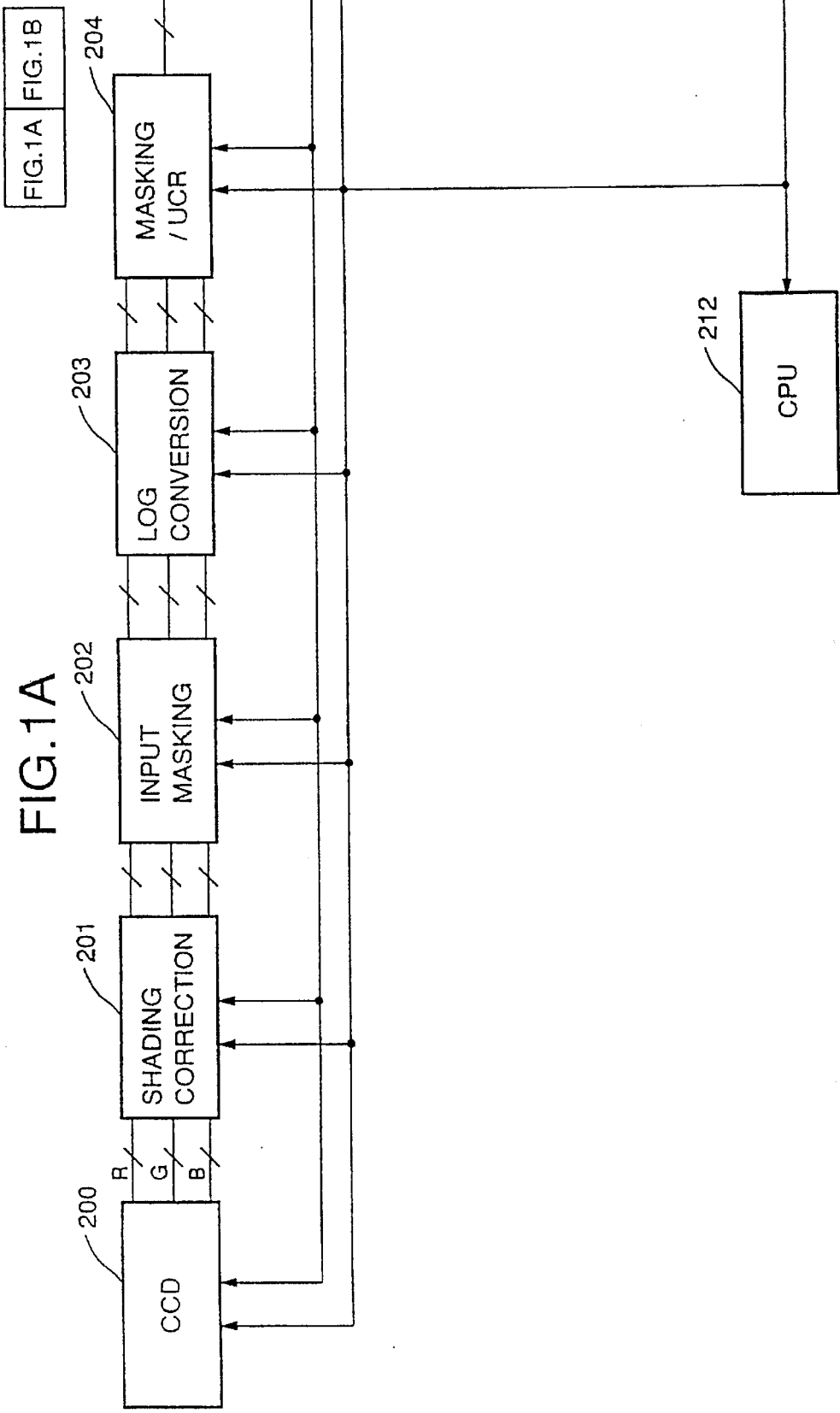

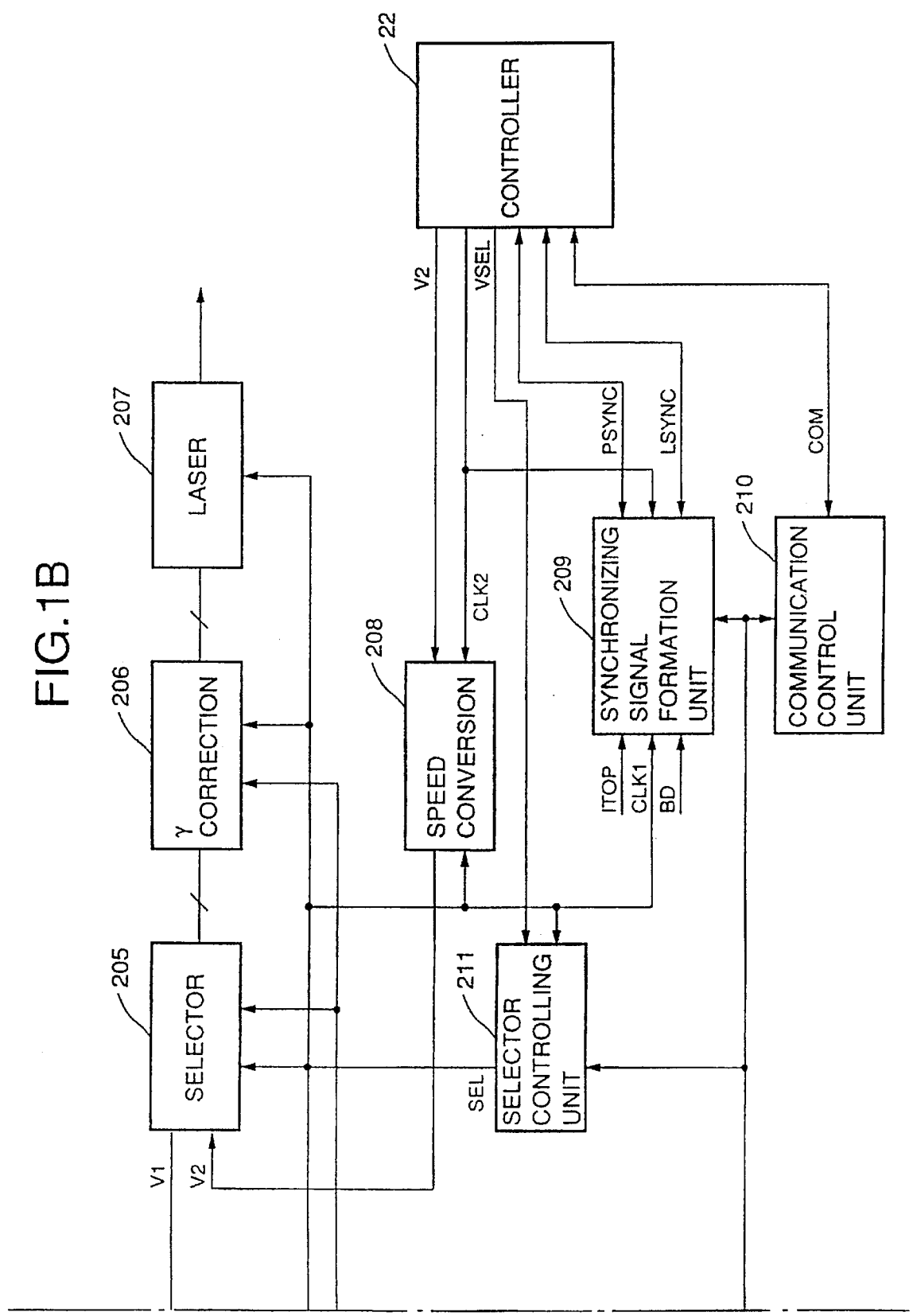

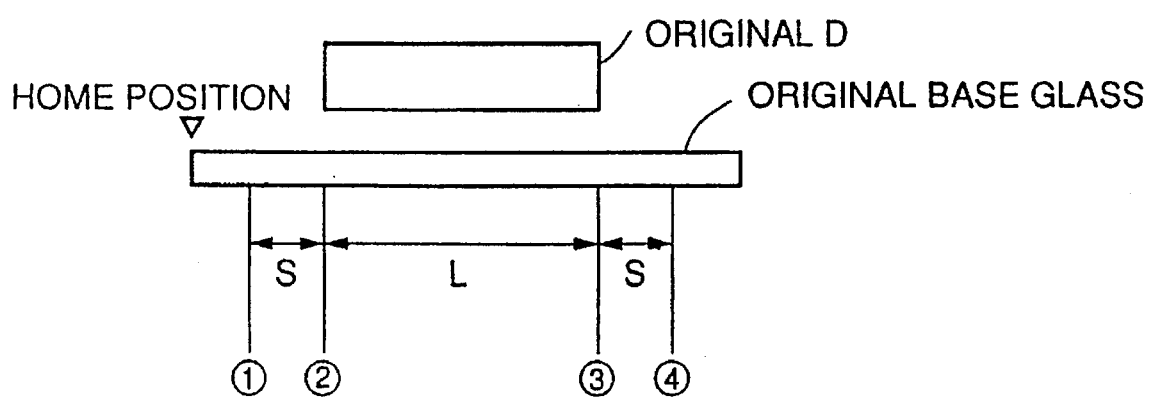

FIG.4A

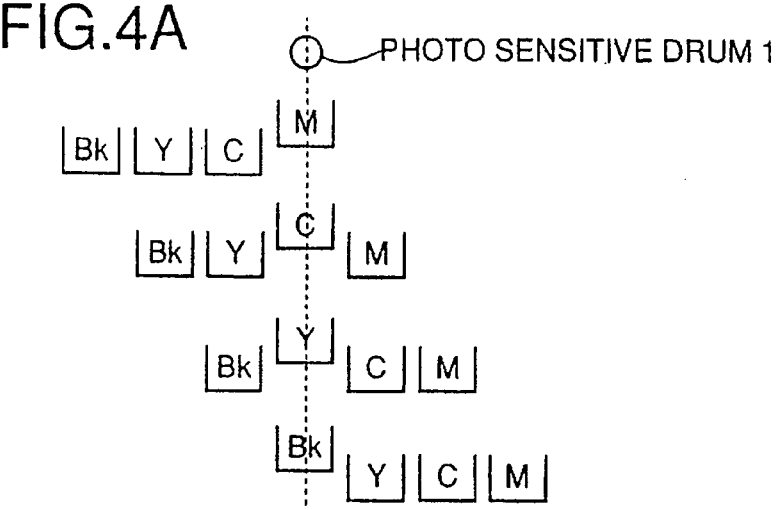
PHOTO SENSITIVE DRUM 1

FIG.4B

| POSITION OF AFTER MOVEMENT \ POSITION OF BEFORE MOVEMENT | M | C | Y | Bk |
|---|---|---|---|---|
| M | 0 | td1 | td2 | td3 |
| C | td1 | 0 | td1 | td2 |
| Y | td2 | td1 | 0 | td1 |
| Bk | td3 | td2 | td1 | 0 |

FIG.4C

| COLOR MODE | DEVELOPING UNIT TO BE USED | | | | DETERMINATION |
|---|---|---|---|---|---|
| | M | C | Y | Bk | |
| MAGENTA | ○ | | | | ○ |
| CYAN | | ○ | | | ○ |
| YELLOW | | | ○ | | ○ |
| BLACK | | | | ○ | ○ |
| BLUE | ○ | ○ | | | ○ |
| RED | ○ | | ○ | | × |
| MAGENTA+BLACK | ○ | | | ○ | × |
| GREEN | | ○ | ○ | | ○ |
| CYAN+BLACK | | ○ | | ○ | × |
| YELLOW+BLACK | | | ○ | ○ | ○ |
| THREE COLOR | ○ | ○ | ○ | | △ |
| BLUE+BLACK | ○ | ○ | | ○ | × |
| RED+BLACK | ○ | | ○ | ○ | × |
| GREEN+BLACK | | ○ | ○ | ○ | △ |
| FOUR COLOR | ○ | ○ | ○ | ○ | △ |

FIG.5

| COMMAND NAME | CONTENTS | CODE(HEX) | PARAMETERS |
|---|---|---|---|
| com1 | PRINT START COMMAND | 80 | NON |
| com2 | PRINT END COMMAND | 81 | NON |
| com3 | DESIGNATION COMMAND OF NUMBER OF PRINT PAPER | 82 | NUMBER OF PRINT PAPER |
| com4 | TRANSFER PAPER SIZE DESIGNATION COMMAND | 83 | TRANSFER PAPER SIZE |
| com5 | COLOR MODE DESIGNATION COMMAND | 84 | COLOR MODE |
| com6 | CCD IMAGE COMPOSITION DESIGNATION COMMAND | 85 | COMPOSITION MODE |
| com7 | STATUS REQUEST COMMAND | 86 | NON |

PARAMETERS

NUMBER OF PRINT PAPER: b7 [0|X|X|X|X|X|X|X] b0 — FROM ONE PAPER TO 63 PAPERS BY BIT 0-6

TRANSFER PAPER SIZE: [0|0|0|0|0|X|X|X]
- 0 A3
- 1 B4
- 2 A4R
- 3 B5R
- 4 A4
- 5 B5

COLOR MODE: [0|0|0|0|X|X|X|X]
- WHEN USING BLACK DEVELOPING UNIT;1
- WHEN USING YELLOW DEVELOPING UNIT;1
- WHEN USING CYAN DEVELOPING UNIT;1
- WHEN USING MAGENTA DEVELOPING UNIT;1

COMPOSITION MODE: [0|0|0|0|0|0|0|X]
- 0 : COMPOSITION OFF
- 1 : COMPOSITION ON

STATUS sts1: [X|X|X|X|X|-|-|-]
- ADSORPTION MODE FLAG
- BUSY FLAG
- ERROR FLAG
- RECEIVING ERROR FLAG
- ACK / NACK FLAG

FIG.8

| DEVELOPING UNIT TO BE USED | | | | DEVELOPING UNIT MOVEMENT MAX TIME td |
|---|---|---|---|---|
| M | C | Y | Bk | |
| ○ | | | | 0 |
| | ○ | | | 0 |
| | | ○ | | 0 |
| | | | ○ | 0 |
| ○ | ○ | | | td1 |
| ○ | | ○ | | td2 |
| ○ | | | ○ | td3 |
| | ○ | ○ | | td1 |
| | ○ | | ○ | td2 |
| | | ○ | ○ | td1 |
| ○ | ○ | ○ | | td1 |
| ○ | ○ | | ○ | td2 |
| ○ | | ○ | ○ | td2 |
| | ○ | ○ | ○ | td1 |
| ○ | ○ | ○ | ○ | td1 |

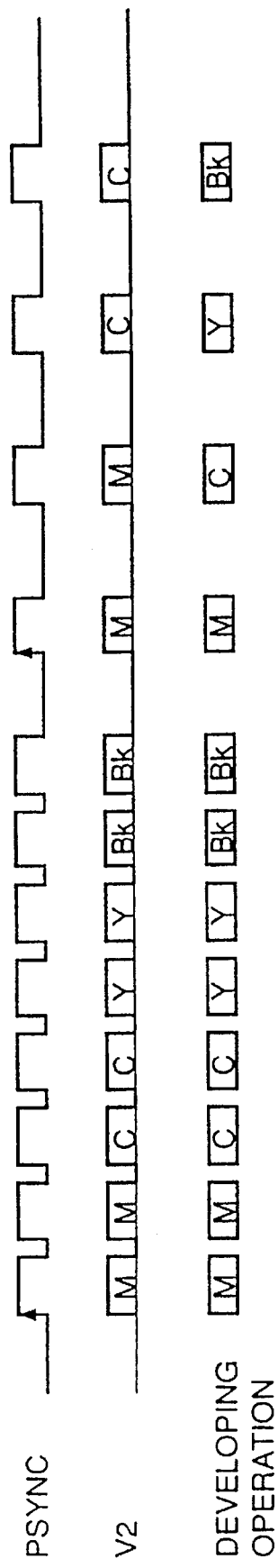
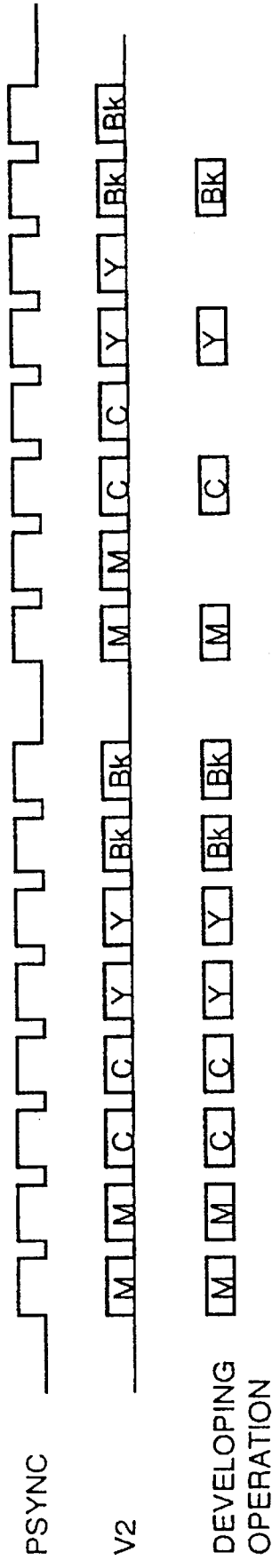

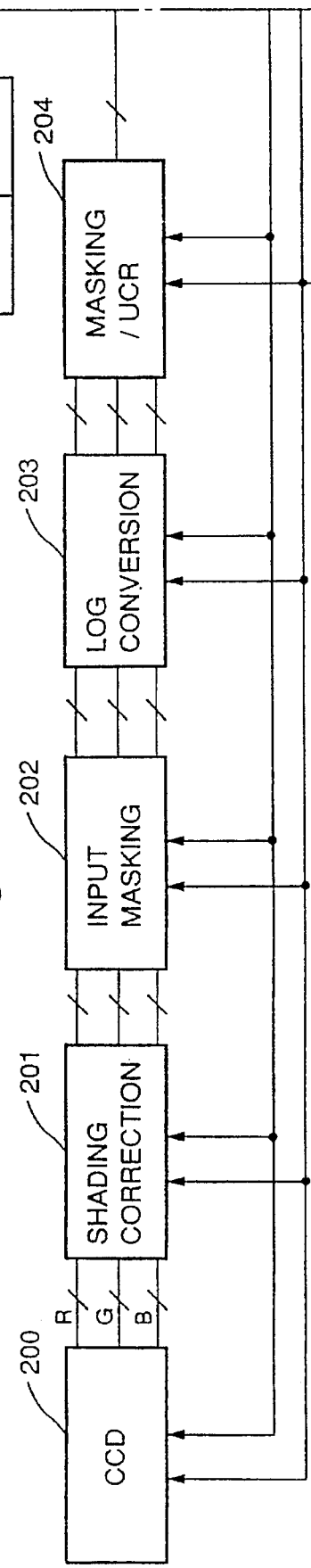

FIG.14A
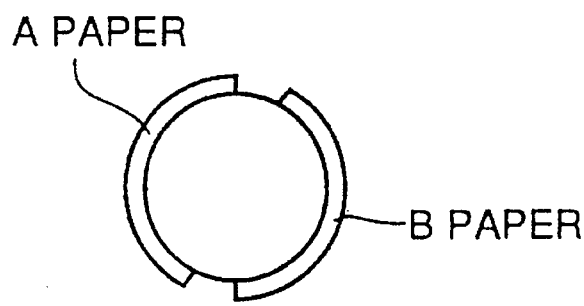
A PAPER
B PAPER
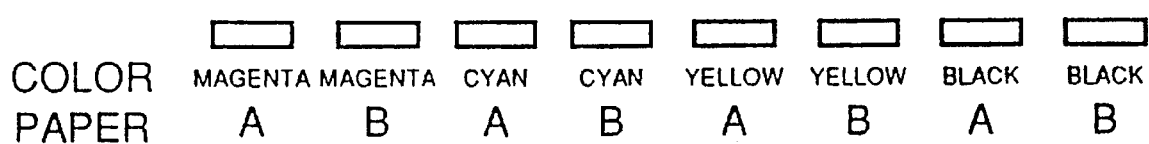
| COLOR PAPER | MAGENTA A | MAGENTA B | CYAN A | CYAN B | YELLOW A | YELLOW B | BLACK A | BLACK B |
FIG.14B
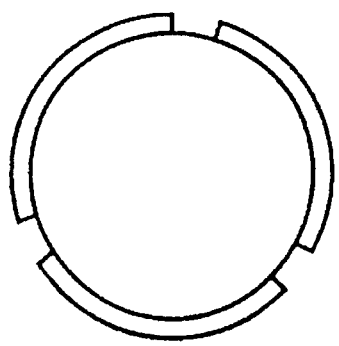

FIG.15

| COLOR MODE \ NUMBER OF RETENTION PAPER | ONE | TWO |
|---|---|---|
| MAGENTA | 0 0 0 0 0 0 0 0 (M M M M)<br>0 0 0 0 0 0 0 0 (M M M M) | 0 0 0 0 0 0 0 0 (M M M M)<br>0 0 0 0 0 0 0 0 (M M M M) |
| CYAN | 0 1 0 1 0 1 0 1 (C C C C)<br>0 1 0 1 0 1 0 1 (C C C C) | 0 1 0 1 0 1 0 1 (C C C C)<br>0 1 0 1 0 1 0 1 (C C C C) |
| YELLOW | 1 0 1 0 1 0 1 0 (Y Y Y Y)<br>1 0 1 0 1 0 1 0 (Y Y Y Y) | 1 0 1 0 1 0 1 0 (Y Y Y Y)<br>1 0 1 0 1 0 1 0 (Y Y Y Y) |
| BLACK | 1 1 1 1 1 1 1 1 (Bk Bk Bk Bk)<br>1 1 1 1 1 1 1 1 (Bk Bk Bk Bk) | 1 1 1 1 1 1 1 1 (Bk Bk Bk Bk)<br>1 1 1 1 1 1 1 1 (Bk Bk Bk Bk) |
| RED | 1 0 0 0 1 0 0 0 (Y M Y M)<br>1 0 0 0 1 0 0 0 (Y M Y M) | 1 0 1 0 0 0 0 0 (Y Y M M)<br>1 0 1 0 0 0 0 0 (Y Y M M) |
| BLUE | 0 1 0 0 0 1 0 0 (C M C M)<br>0 1 0 0 0 1 0 0 (C M C M) | 0 1 0 1 0 0 0 0 (C C M M)<br>0 1 0 1 0 0 0 0 (C C M M) |
| GREEN | 1 0 0 1 1 0 0 1 (Y C Y C)<br>1 0 0 1 1 0 0 1 (Y C Y C) | 1 0 1 0 0 1 0 1 (Y Y C C)<br>1 0 1 0 0 1 0 1 (Y Y C C) |
| FOUR COLOR | 1 1 1 0 0 1 0 0 (Bk Y C M)<br>1 1 1 0 0 1 0 0 (Bk Y C M) | 0 1 0 1 0 0 0 0 (C C M M)<br>1 1 1 1 0 1 0 0 (Bk Bk Y Y) |

COLOR IMAGE FORMING APPARATUS HAVING MEANS FOR DETERMINING THE NUMBER OF TRANSFER MEMBERS SUPPORTED ON THE TRANSFER MEMBER RETAINING MEANS

This application is continuation of 08/310,332, Sep. 22, 1994, abandoned, which is a division of application Ser. No. 07/891,206, filed Jun. 1, 1992, U.S. Pat. No. 5,383,012, in Jan. 17, 1995.

BACKGROUND OF THE INVENTION

1. Field of the Invention

The present invention relates to a color image forming apparatus for forming a multicolor image by forming an image of each color, and more particularly to an apparatus with a controller capable of processing a plurality of sheets for each color.

2. Related Background Art

Conventionally, an apparatus has been known wherein a plurality of color images developed by developing units for respective colors are superimposed on a transfer paper carried on a transfer drum onto form a full-color image, with a color image forming method referred to as a multiple transfer method, using the electrophotographic technology, for example.

Also, such an apparatus has been known wherein color images are sequentially superimposed on a plurality of transfer members carried at different positions on a transfer drum so as to improve the full-color image forming speed per unit time.

However, for controlling the retention of a plurality of transfer papers as in the above-described conventional example, there are a number of considerations such as the original reading length and the optical system driving motor speed, the developing unit travel distance and the developing unit driving motor speed, etc., so that it is impossible to determine whether the retention of a plurality of sheets is possible or not by taking into consideration only the size of transfer paper.

FIG. 3 shows an instance in which two A4-sized transfer papers are retained on a transfer drum to copy an original D in the above example. When the peripheral length of the transfer drum is e.g. 502.4 mm and two A4-sized papers are retained, the transfer paper interval is 41.2 mm, or equivalently about 257 msec at a predetermined rotation speed of the transfer drum (FIG. 3A). The read scanning of the original is performing in such a way as to start to accelerate the optical system driving motor from ① a distance S forward of the original D, reaching a predetermined speed Vfmm/sec by ② at a leading edge of the original D, scanning at a constant speed a distance L to ③ at a trailing edge of the original, then decelerating the motor, and stopping at a position ④ a distance S backward of the original D. Thereafter, for the next read scanning operation, the system is moved back to a position ① at a maximum speed of Vbmm/sec (FIG. 3B). That behavior is shown in FIG. 18, in which the speed V is indicated at the vertical line and the time t at the transversal line. For the copy of two retained papers, the time period from the time t1 at the completion of image reading from the first transfer paper to the time t2 at the start of image reading from the second transfer paper, i.e., (t2–t1), must be equal to or less than the above-mentioned transfer paper interval time, i.e., 257 msec. Accordingly, the possibility of the retention of two sheets must be determined depending on the reading speed or copying magnification which is a deterministic factor for the rising or falling time ts, as well as the scanning distance L which is a deterministic factor for the movement back time tb. Further, on the two-sheet retention print, it is necessary to consider the time required to move the developing unit. For example, when the developing units for four colors of Bk, Y, C and M are arranged on a line, the developing units are positioned in four ways with respect to a photosensitive drum, as shown in FIG. 4A. The travel time from one developing unit position to the other is shown in FIG. 4B. The vertical line indicates the position before movement and the transversal line indicates the position after movement. The time required for the movement between neighboring developing units (M-C, C-Y, C-Bk) is td1, the time required for the movement between one-position skipped developing units (M-Y, C-Bk) is td2, and the time required for the movement of M-Bk is td3. For the print of two retenting sheets, the movement between used developing units must be performed within the previously-mentioned transfer paper interval time, i.e., 257 msec. For example, the possibilities of td1<257 msec<td2<td3 are shown in FIG. 4C. For example, when two developing units are used, blue and green are possible (C) but red is impossible (x). Further, there is a case, such as the four-color, that the retention of two sheets is possible, but a margin equivalent to one sheet must be taken between the print of first two sheets and that of next two sheets for the return from Bk to M (Δ).

There was a problem that it was difficult to make an appropriate control to cope with such different occasions, or became more complex even if possible.

SUMMARY OF THE INVENTION

It is an object of the present invention to provide a color image forming apparatus with a controller which can solve the problem.

It is another object of the present invention to provide a color image forming apparatus with a controller which can reproduce a color image at a high speed with a simple construction.

It is a further object of the present invention to provide a color image forming apparatus with a controller which can form a proper color image with a simple control.

According to a preferred embodiment of the present invention, there is disclosed a color image forming apparatus with a controller for forming a multicolor image by forming an image of each color, comprising transfer member holding means for hold in a plurality of transfer members, image forming mean for forming the image based on an image signal from the controller, and detecting means for detecting information of transfer members held on the transfer member holding and outputting detected information to an external device.

It is a still further object of the present invention to provide a color image forming apparatus with a controller having the novel functions and interface.

The other objects and features of the present invention will be apparent from the ensuing description by way of example and with the accompanying drawings.

BRIEF DESCRIPTION OF THE DRAWINGS

FIGS. 1A, 1B are a circuit configuration block diagram in one embodiment of the present invention.

FIGS. 3A and 3B are explanation diagrams for the timing.

FIGS. 4A, 4B, 4C are explanation views for the color mode.

FIG. 5 is an explanation view for the communication command.

FIG. 8 is an explanation table for the developing unit movement time.

FIGS. 9A and 9B are explanation views for the timing.

FIGS. 12, 12A, 12B are a circuit configuration block diagram.

FIGS. 14A and 14B are explanation views for the plural-paper adsorption.

FIG. 15 is an explanation view for the third embodiment.

DESCRIPTION OF THE PREFERRED EMBODIMENTS

The embodiments of the color image forming apparatus according to the present invention will be specifically described below with reference to the drawings.

Figure 2:
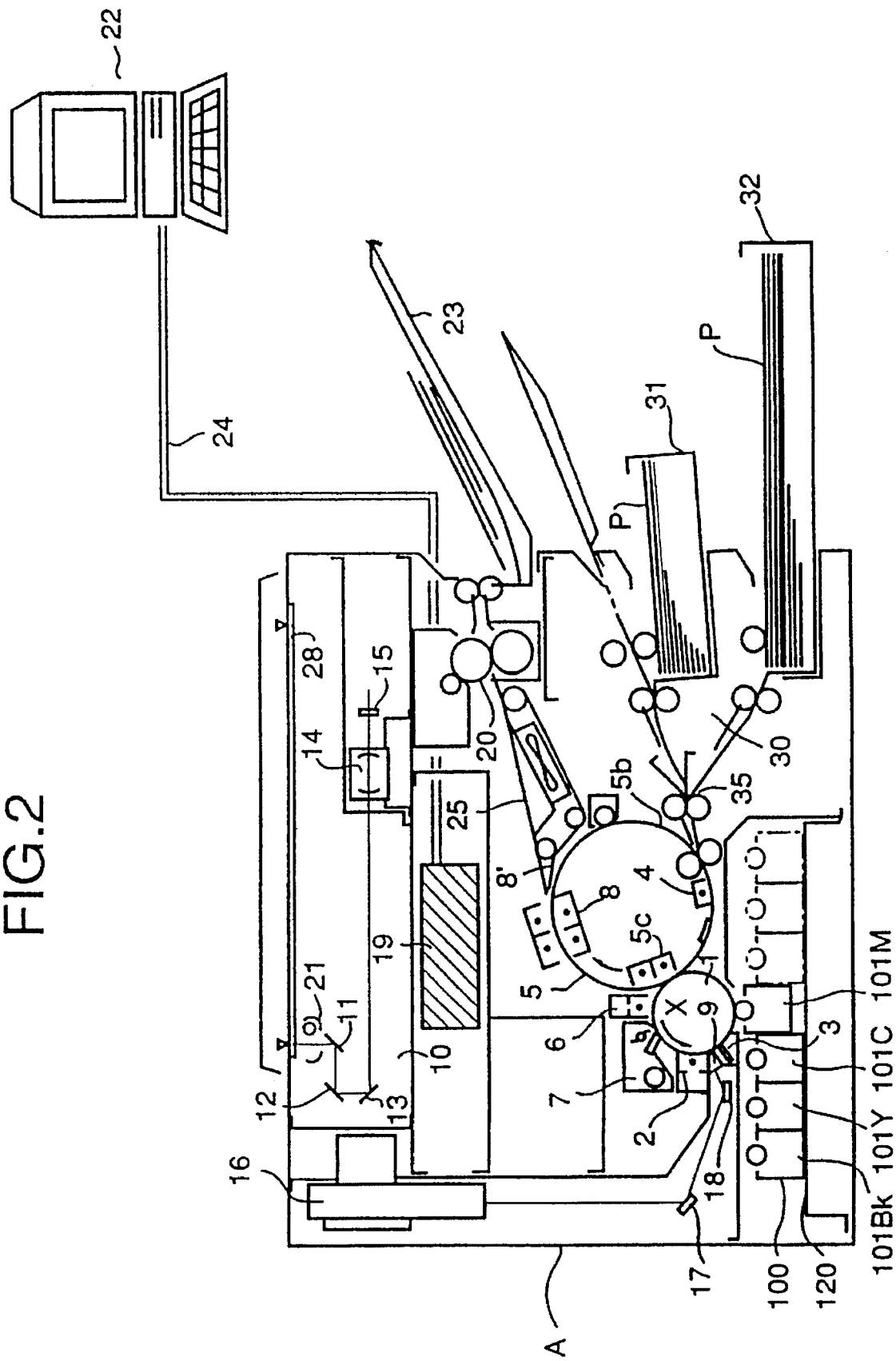
FIG. 2 is a cross-sectional view of a color copying apparatus in one embodiment of the present invention.

FIG. 2 shows a full-color electrophotographic copying apparatus A for use as a printer in this invention. In FIG. 2, 1 is photosensitive drum, 2 is primary charger, and 3 is surface potentiometer for measuring the surface potential of drum. Surrounding the photosensitive drum 1, there are disposed developing device 100 having a carrier 120 movable to the left or right and mounting a plurality of developing units 101M, 101C, 101Y, 101Bk which use a two-component developer containing a mixture of toner and carrier, transfer drum 5, preliminary static eliminator 6, and cleaner 7.

Optical system 10 is constituted of original illuminating lamp 21, first mirror 11, second mirror 12, third mirror 13, imaging lens 14, CCD 15 having B, G and R filters, laser scanner unit 16, and stationary mirrors 17, 18. Lamp 21 and mirror 11 can scan an original on original base glass 28 at a speed twice that of mirrors 12, 13. The reflected light from the original is imaged through lens 14 onto CCD 15. The original image is color decomposed by CCD 15 which has B, G and R filters, converted into electrical signal in image processing circuit 19, treated with the image processing such as A/D conversion, and then sent to a laser driver within the laser scanner unit 16. The laser beam oscillated by the image signal passes through a polygon scanner within unit 16, via mirrors 17, 18 onto photosensitive drum 1 to form a latent image.

On the right hand of the copying apparatus, there are disposed fixing device 20 and paper feeder 30, with transfer paper conveying systems 25, 35 provided on the respective routes to transfer drum 5, respectively.

Photosensitive drum 1 is subjected to the charging, exposure, developing, transfer and cleaning processes which are carried out by primary charger 2, optical system 10, developing device 100, transfer drum 5, and cleaner 7, respectively, for each of four developing colors M (magenta), C (cyan), Y (yellow) and Bk (black).

Transfer drum 5 is rotated so that a latent image for each developing color on photosensitive drum 1 is transferred while a transfer paper P fed from transfer paper cassette 31 or 32 of paper feeder 30 by conveying system 35 is being retained electrostatically onto transfer sheet 5b by an retaining charger 4 disposed within transfer drum 5. Transfer charger 5c is disposed in a transfer area.

Transfer paper P on which a toner image for each developing color is sequentially transferred is peeled off from transfer sheet 5b by means of separating charger 8 and separating claw 8', and conveyed to fixing device 20 by conveying. system 25. The toner images on transfer paper P are fixed thereto by fixing device 20, transfer paper P being discharged onto tray 23.

Image processing circuit 19 is connectable via interface cable 24 to external device 22 such as a host computer, whereby it is possible to print the image information transmitted from host computer 22, transmit the read original image information to host computer 22, and print a composition of read original image information and the image information transmitted from the host computer 22 with the aid of selector 205 under the control of selector controller 211.

The transfer drum in this embodiment is 160 mm in diameter, and 502.4 mm in peripheral length, and is capable of retaining a paper as large as A3 (420 mm long) or 11"×17" (431.8 mm long) at maximum. As the process speed is 160 mm/sec, it takes 3.14 sec to form one color image of A3 size, and 12.56 sec to make the full-color copy of four colors. Accordingly, the copy or print speed is about 19 papers per minute for the monochrome (magenta, cyan, yellow or black), and about 4.77 papers for the four-full-color. By controlling so that only one sheet of transfer paper is retained on the transfer drum at all times, the copy/print speed becomes irrelevant to the size of transfer paper.

However, with a short length of the transfer paper, it is possible to retain a plurality of transfer papers onto the transfer drum. For example, it is possible to retain two transfer papers such as transfer paper of A4 (210 mm long), B5 (182 mm long) or LTR (215.9 mm long) in size at the same time, as shown in FIG. 14A. In such a case, if two transfer papers are assumed to be A paper and B paper, the copy speed is 9.55 sheets per minute by performing the formation for a full-color original copying image of four colors in a sequence of magenta (A), magenta (B), cyan (A), cyan (B), yellow (A), yellow (B), black (A) and black (B), resulting in a great improvement of specification. Conversely, with a half process speed of 80 mm/sec, the copy can be realized at the same rate as for the retention of one paper at a process speed of 160 mm/sec, if the dimension is capable of retaining two papers at the same time, thereby allowing for the cost reduction.

If the diameter of the transfer drum is 240 mm, for example, three transfer papers for A4 size can be retained at the same time, as shown in FIG. 14B, resulting in a further speed-up and cost reduction.

The embodiments of the control system for controlling an apparatus as shown in FIG. 2 will be described below.

First Embodiment

FIG. 1 shows an image processing circuit of a color image forming apparatus according to the present invention, which will be described below.

CCD reader 200 converts the optical information of an original image into electrical signal, and amplifies it. An image signal is subjected to the shading correction at 201, the correction for the color filter characteristics by an input masking unit 202, the conversion of the light density by LOG conversion unit 203, and the correction for the toner density characteristics by an output masking/UCR processor 204 to obtain an image signal V1 corresponding to a developing color. Selector 205 allows image signal V1 read by the CCD and an image signal V2 from the host computer 22 to be switched pixel by pixel, thereby printing only V1 or V2, or a composition of V1 and V2. The image signal is then corrected for the gamma characteristics in accordance with the electrophotographic process by a gamma correction unit 206 to drive a laser 207.

Image signal V2 transmitted in synchronism with a clock CLK2 of the controller side from the controller 22 is converted by a speed converter 208 to be transmitted in synchronism with a clock CLK1 of the color image forming apparatus side to selector 205. A synchronizing signal formation unit 209 picks up a horizontal synchronizing signal BD obtained in synchronism with the rotation of a polygon scanner or an ITOP signal obtained in accordance with the rotation of the transfer drum 5, and generates an image clock CLK1, a vertical synchronizing signal PSYNC transmitted to the controller 22, or a horizontal synchronizing signal LSYNC. Communication controlling unit 210 make the serial or parallel communication with the controller 22 via a signal line COM. Selector controlling unit 211 produces signal SEL for the selector to make the switching between the CCD image signal V1 and the computer image signal V2 pixel by pixel. It is also possible for the controller 22 to directly control the signal SEL for each pixel by the use of a signal VSEL. The above each processor is controlled by CPU 212 comprising a well-known timer circuit, an I/O circuit and an interrupt circuit.

FIG. 5 shows the command/status for the communication between the color image forming apparatus and the controller. The commands transmitted from the controller include com 1: print start command, com 2: print end command, com 3: designation command for number of print paper, com 4: transfer paper size designation command, com 5: color mode designation command, com 6: CCD image composition designation command, and com 7: status request command. The com 3, com 4, com 5 and com 6 are followed by respective corresponding information as parameters. After the reception of each command and corresponding parameter, a status sts1 constituted of 8 bits, for example, is returned from the color image forming apparatus. The meaning of each bit for the sts1 is as follows; bit7: ACK/NACK (0: ACK when the command is normally received and executable, 1: NACK otherwise), bit 6: receiving error (1 when an undefined command is received or an communication error occurs, 0: otherwise), bit 5: error flag (1 when an error occurs in the color image forming apparatus so that the print is disenabled, 0: when the print is enabled), bit4: busy flag (1 when the print is operating, 0: otherwise), and bit3: retention mode (1 when two sheets are retained, 0 when one sheet is retained).

Figure 6:
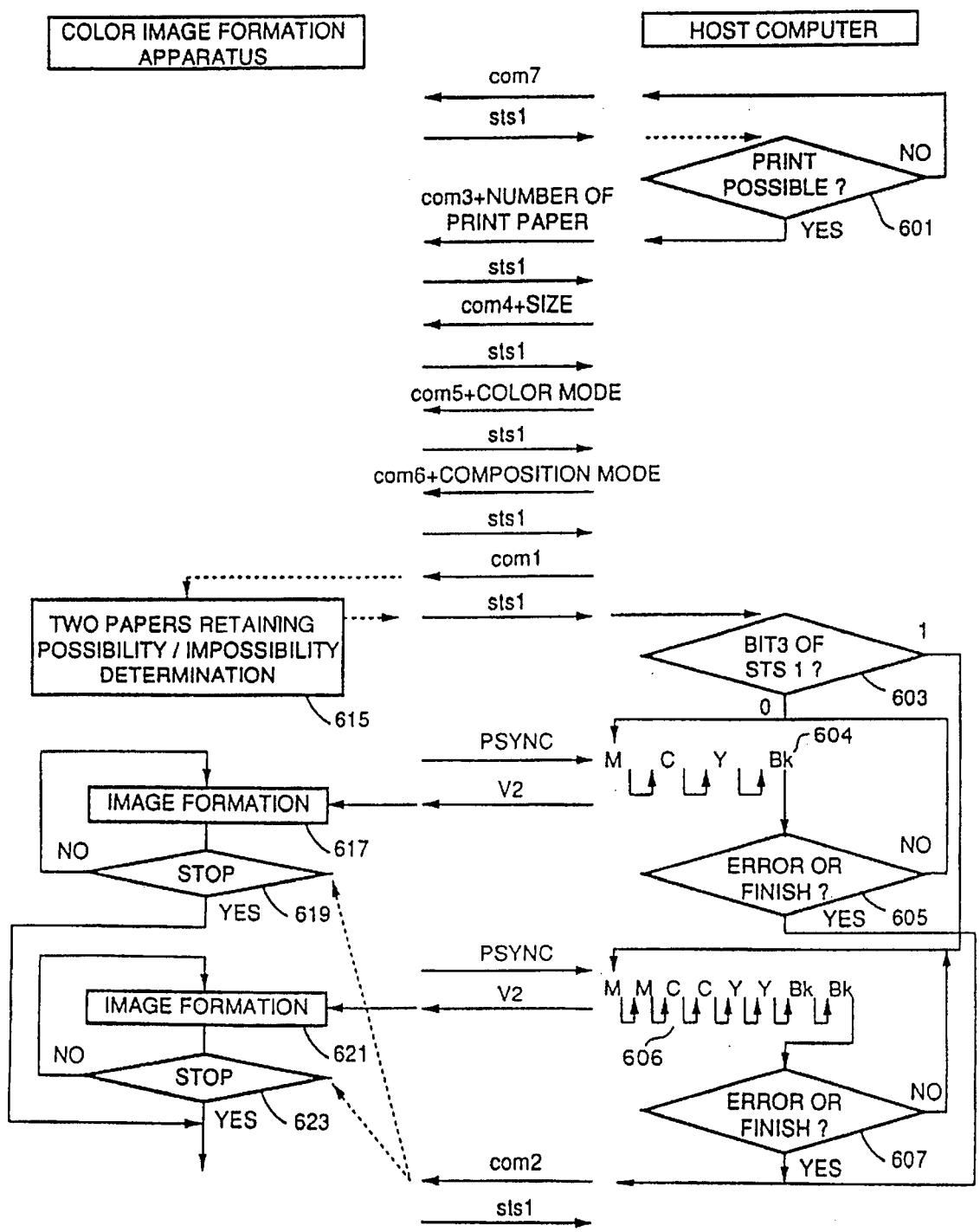
FIG. 6 is an explanation view for the communication protocol.

FIG. 6 shows the handshaking between the controller and the color image forming apparatus by the use of these commands/statuses.

The controller first checks to see if the color image forming apparatus is printable by the use of com7 (601), and if so, sends out a print paper number designation command (com3+number of print paper), a transfer paper size designation command (com 4+size of transfer paper), a color mode designation command (com5+color mode), and a CCD image composition designation command (com6+ synthesizing mode) in this sequence. Thereafter, if the start of print is directed by the coral, the color image forming apparatus determines whether or not two papers can be retained (615), because the print conditions have been set, thereby controlling the bit 3 of the status sts1. The details of the possibility/impossibility determination will be described later. The controller determines the bit 3 of the status sts1 (603), whereby the developing color image is output in accordance with a specified color mode, using a PSYNC signal transmitted from the color image forming apparatus as a vertical synchronizing signal (604, 606). The controller sends out a print end command com2 before the completion of the print for the designated paper number, if the print is to be stopped. The color image forming apparatus continues to form the image until the formation of image is completed for the designated paper number or color number, or the command com2 is received (619).

When the full-color mode of four colors is directed, image signals are sent out in synchronism with the PSYNC signal by repeating M, M, C, C, Y, Y, Bk, Bk, if the retention of two papers is possible (607), or otherwise, image signals are sent out in synchronism with the PSYNC signal by repeating M, C, Y, Bk. In the above way, the print for two retaining papers is possible, without the necessity of complex conditions on the controller side, such as the determination for the size of print paper, the type of image forming apparatus or the color mode.

Figure 7:
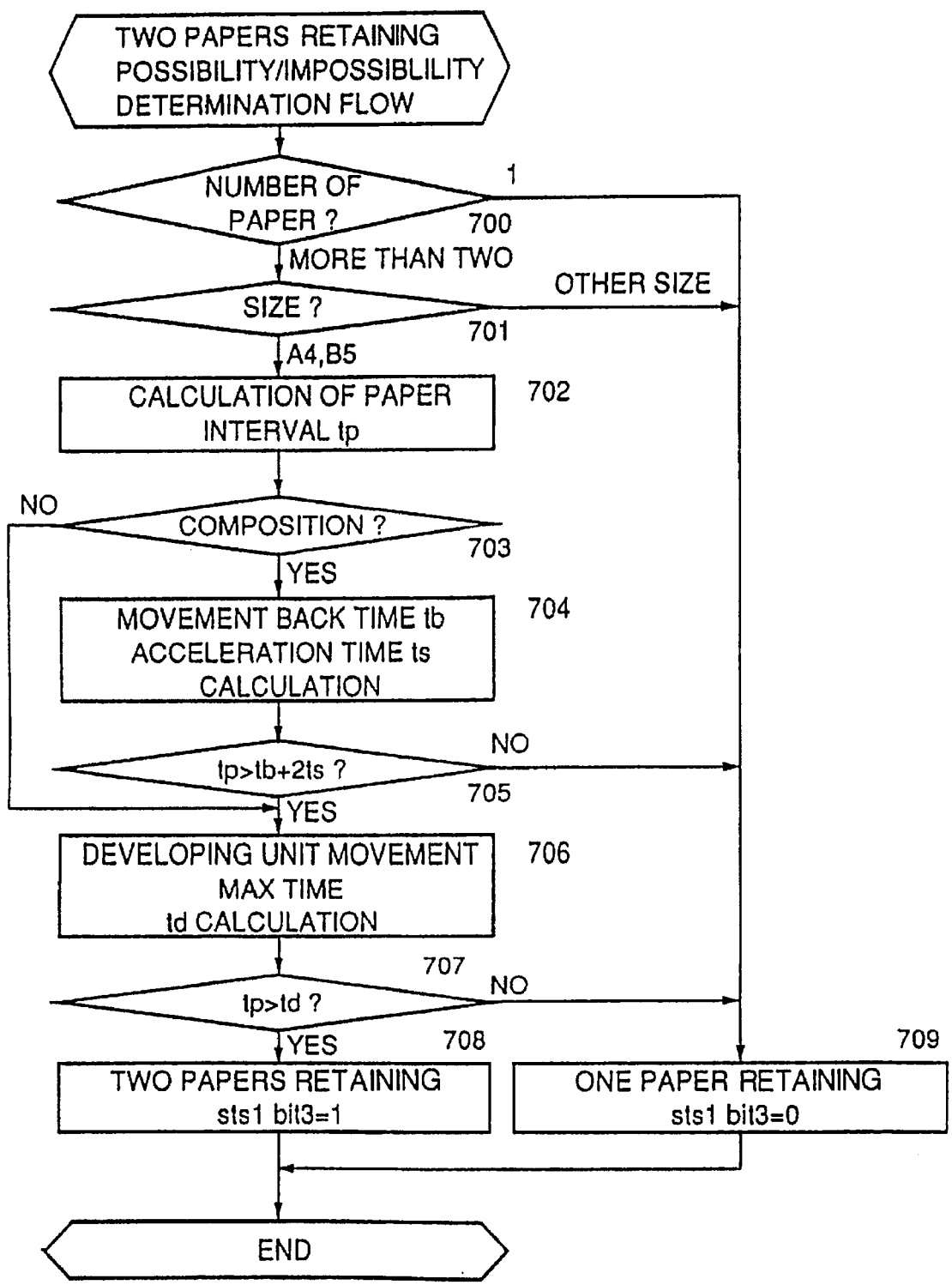
FIG. 7 is a flowchart for the two-paper adsorbing possibility/impossibility determination.

FIG. 7 shows a flowchart for determining whether or not two papers can be retained in the image forming apparatus. At step 700, the designated number of papers is determined. If it is one paper, the determination is "no", or if it is more than one paper, the operation proceeds to step 701, where the size of transfer paper is determined. For other than A4 and B5, the determination is "no", or for A4 or B5, the operation proceeds to step 702, where the transfer paper interval time tp for two retaining papers is calculated. At step 703, the compositions of CCD images is judged. If not composed, the operation proceeds to step 706. If composed, at step 704, the optical system back movement time tb and the acceleration time, which are determined by the reading original length L and the reading magnification or reading speed Vf, are calculated as previously performed. At step 705, a comparison is made between the transfer paper interval time tb and (tb+2*ts). If tp is smaller, the determination is "no". If tp is greater, the retention of two papers is allowed for scanning the original. At step 706, the maximum time td taken to move the developing unit during the formation of image in the designated color mode is calculated. Using the developing unit movement times td1, td2 and td3 as previously described, the relation of the color mode with td is as shown in FIG. 8. At step 707, a comparison is made between the transfer paper interval time tp and the developing unit movement maximum time td. If the tp is smaller, the determination is "no", of if it is greater, the retention of two papers is "possible".

Since the number of retainable papers is notified to the controller in this embodiment as above described, in a constitution capable of retaining and printing a plurality of papers, it is possible to provide a color image forming apparatus which does not require the controller to have any complex control in consideration of previously described various intrinsic conditions on the color image forming apparatus side.

Second Embodiment

In the first embodiment, the controller sends out the image signal V2 in accordance with the vertical synchronizing signal PSYNC which is output in synchronism with the timing of image formation onto retained paper, but it is associated with a disadvantage as will be described later when the number of retaining papers changes during the print In the second embodiment, a color image forming apparatus is provided which is capable of printing plurality of retaining papers and does not require any complex control on the host computer side when number of retaining papers changes during the print.

The factors which causes the number of retained papers to change during the print include the odd number of prints, paper exhaust, and paper jamming.

The print of two retained papers will be described below as in the first embodiment. FIG. 9A shows an example of inconvenience wherein when four sheets of four-color print are necessary, there are only three sheets left in a paper supply cassette. Since the PSYNC signal is output corresponding to the number of papers from the image forming apparatus of this embodiment, it is output for the first two papers, once for each half rotation of the transfer drum, but the third paper only is retained onto the transfer drum, without the fourth paper. In this case, CPU212 outputs only one PSYNC for one rotation of the transfer drum. However, the controller outputs the image signal V2 correspondingly to the PSYNC signal in a sequence of M, M, C, C, Y, Y, Bk, Bk in accordance with the print procedure as previously described and shown in FIG. 6. The third paper should be essentially given the image signals V2 of M, C, Y, Bk, but the sequence of M, M, C, C is encountered to the image as seen in the figure. The positioning of the developing unit and the developing operation are correctly performed with respect to the paper retained to the transfer drum in a sequence of M, C, Y, Bk, but a desired color print can not be naturally obtained.

FIG. 9B shows the control method in the second embodiment which can resolve such an inconvenience. In the second embodiment, the dummy PSYNC signal is output from the image forming apparatus to the fourth paper which is not actually retained. As seen in the figure, if the controller 22 outputs the image signal for each PSYNC signal in a sequence of M, M, C, C, Y, Y, Bk, Bk, whether the paper exists or not, the image signals of M, C, Y, Bk will be correctly given to the third paper sequentially. Such dummy PSYNC signal is output from the synchronizing formation unit 209 of the image forming apparatus. For the fourth paper, the developing operation is not performed, so that unnecessary image is not formed on the photosensitive drum to make the transfer drum dirty.

The control method as shown in FIG. 9B is effective when the number of retained papers changes in the course of the print due to an unexpected cause, such as the paper exhaust as well as the paper jamming, as previously described. Also, it is effective in the meaning that any complex control is required on the controller side, including a case in which it is expected prior to the start of operation that the number of retained papers will change, as typically seen in the case where the odd number of retention papers are printed with an apparatus capable of retaining two papers. That is, the computer is not necessary to "monitor the state of the image forming apparatus at all times and control the color of image information to be output in accordance with the state", but only necessary to "output the image information for each PSYNC signal in a predetermined sequence."

New prepared commands and statuses in the second embodiment are listed in the following.

| Command name | Contents | Code (HEX) | Parameters |
| --- | --- | --- | --- |
| com8 | Retention number request command | 87 | None |
| com9 | Printed paper number request command | 88 | None |
| Status name | Contents | | |
| sts2 | 000000XX | | |
| sts3 | 0XXXXXXX | | | com8 is a command for requesting the number of retention paper. One such command is sts2. sts2=0 for the one-paper retention, sts2=1 for the two-paper retention and sts2=Q-1 for the Q-paper retention. For example, in the three-paper retention, sts2=2, and when the color mode is red, the host computer 22 outputs the image information for each PSYNC signal in a sequence of "M, M, M, Y, Y, Y" repeatedly. With the provision of this command, the controller can cope with the printing of any plural number of adsorption papers.

A command for requesting the number of normally printed papers com9 in a series of print operations following the print start command. The host computer sends out com9 to the color image forming apparatus after the print operation, and receives sts3. The difference between the number of papers directed by com3 as described previously in FIG. 5 and the number of printed papers received by sts3 is the number of unprinted papers. In the instance of FIG. 9B as previously described, the number of printed papers is "3" for the designated number of papers "4", and it will be understood that the fourth paper has not been normally completed. Besides the provision of the com9 of noticing the number of printed papers (sts3), there is a method of providing com10 for requesting the number of unprinted papers (sts4).

| Command name | Contents | Code (HEX) | Parameters |
| --- | --- | --- | --- |
| com10 | Unprinted paper number request command | 87 | None |
| Status name | Contents | | |
| sts4 | 0XXXXXXX | | |

In the conventional control protocol for the so-called laser printer, the number of printed papers such sts3 and sts4 are not required specifically, though they may be effectively used at the paper jamming, and the number of print papers can be counted on the computer side at the paper exhaust. In this embodiment, they are effective in all cases including the occurrence of an error such as the paper exhaust, the paper jamming, etc., and further during the normal print operation, so that the computer can manage the number of papers with the same control, whether or not the print operation is normally ended or not.

Figure 10:
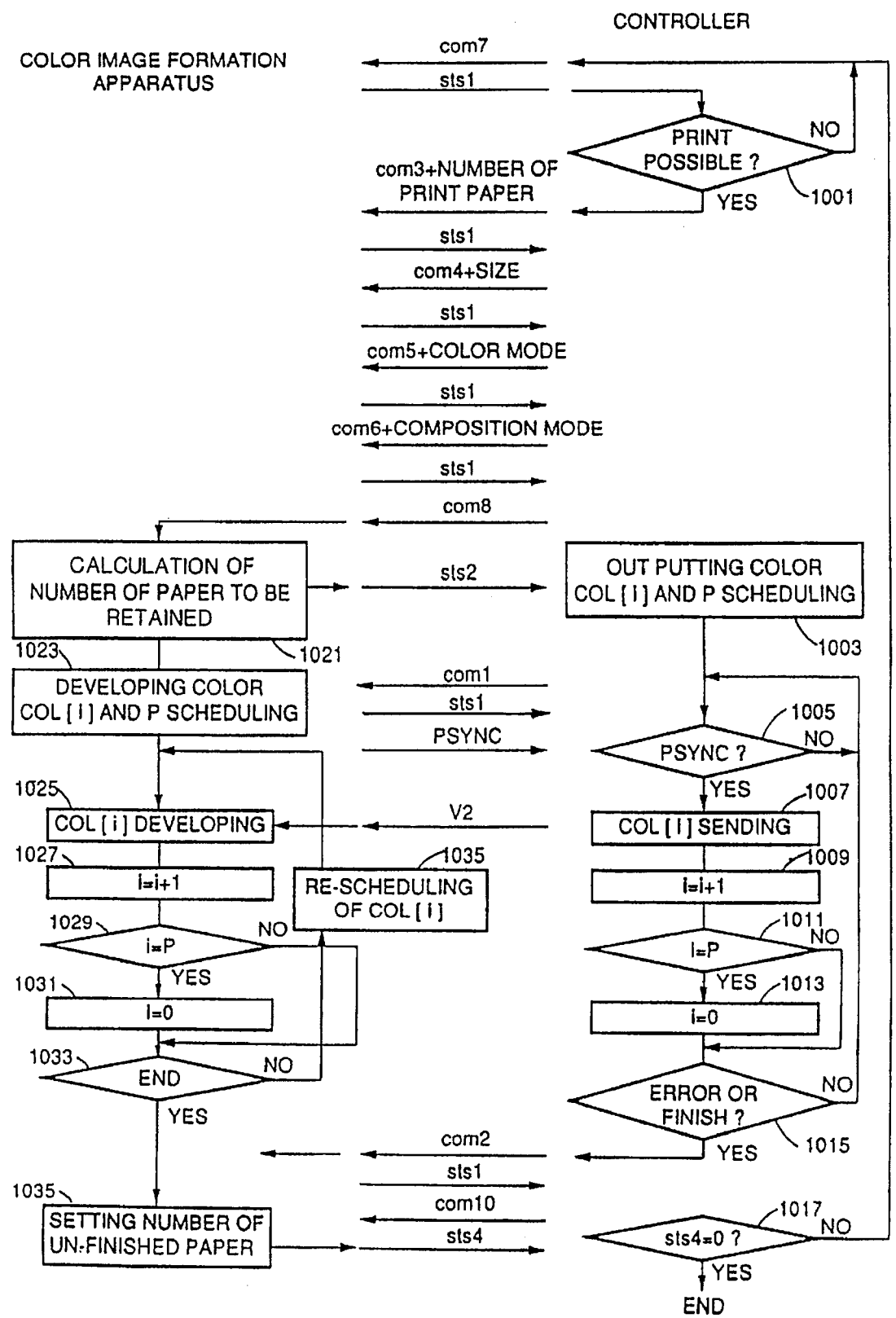
FIG. 10 is an explanation view for the communication protocol.

FIG. 10 shows a procedure for the handshaking between the color image forming apparatus and the host computer in the second embodiment, which will be described below.

The procedure from the transmission of a status request com7 to the transmission of a composition mode designation com6 is the same as in the first embodiment, and so the explanation will be omitted. Upon the completion of the designation for the operation mode, the host computer sends out an output sequence request command com8. The color image forming apparatus calculates the number of papers to be retained based on the designated mode (1021), which is then notified to the host computer as sts2. Thereafter, both the color image forming apparatus and the host computer determine a schedule array COL[i] and a cyclic limiter P which define the sequence of developing colors or output colors, following a scheduling flow as will be described later (1003, 1023). The content of the array COL[i] is any one of color data M, C, Y and Bk, the suffix i indicating the order of development or output. The limiter P can be obtained by P=QxT, where Q is the number of retention papers and T is the number of developing colors. The host computer outputs the image data of the color indicated by COL[i] for each PSYNC signal in a sequence of COL[0], COL[1], . . . COL[P-1], COL[0] repeatedly.

In the developing color array COL[i] on the color image forming apparatus side, the rescheduling process for the developing color array COL[i], as will be described later, is performed on occasion to cope with the change in the number of retention papers which occurs in such a case as the odd number of printing papers, paper exhaust, or paper jamming. Consequently, a code indicating the unnecessary development is-set to the array element corresponding to the dummy PSYNC as previously described, and the actual development is not performed.

Figure 11:
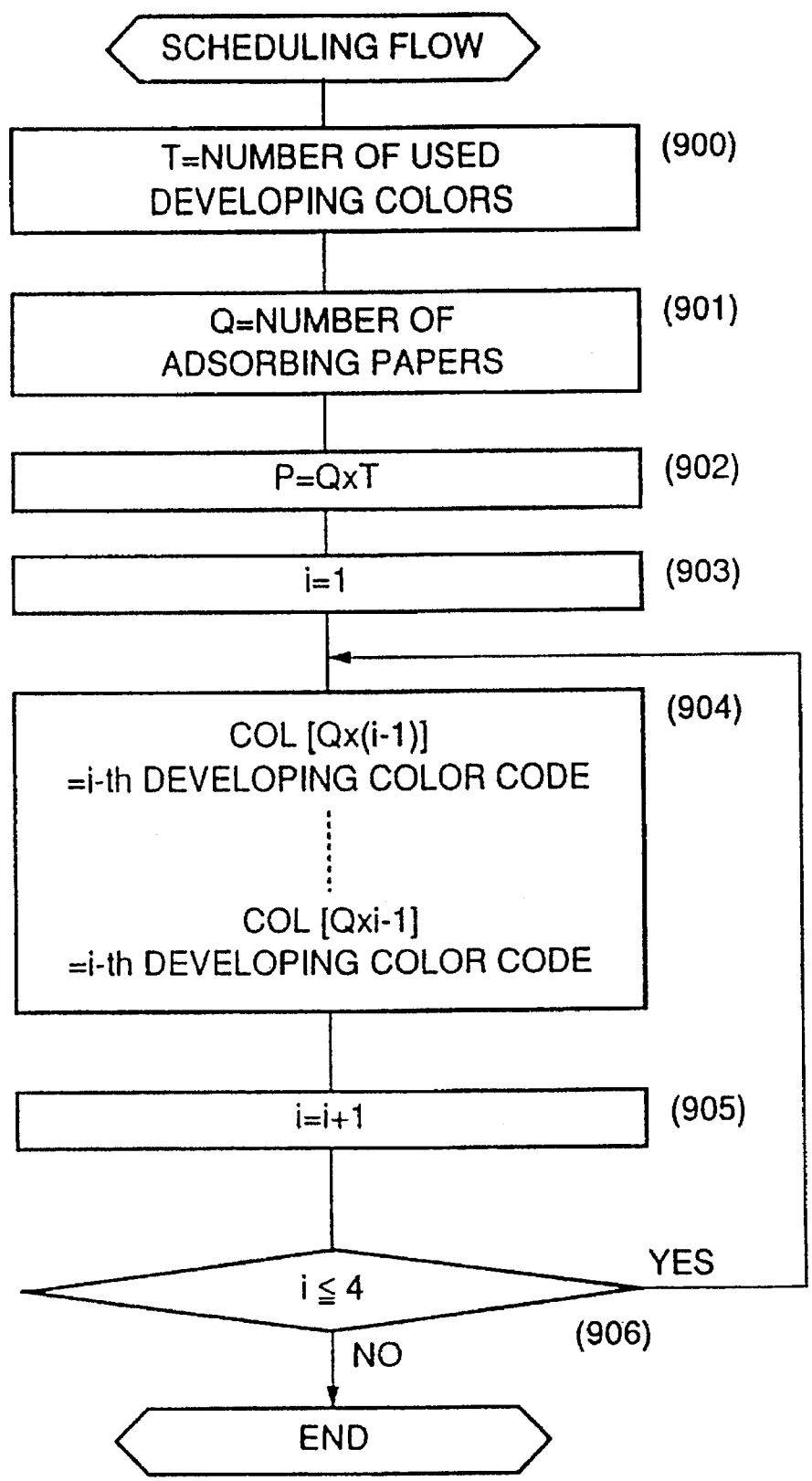
FIG. 11 is a control flowchart.

FIG. 11 shows a scheduling flow of COL[i]. The number of used developing colors is set to the area T on a RAM (900). T is equal to 1 for the color modes of magenta, cyan, yellow and black, T is equal to 2 for red, green and blue, T is equal to 3 for the three-full-color, and T is equal to 4 for the four-full-color. Then, the number of retention papers is set to the area Q on the RAM (901). For example, Q is equal to 2 for the two-paper retention print. For the limiter as previously described, QxP is set to the area P on the RAM (902). A code indicating an image color to be output by the controller or a developing color to be processed by the color image forming apparatus is set to the array Q[i] on the RAM. The first developing color code is set to COL[0] to COL [Q-1], the second developing color code to COL[Q] to COL[2Q-1], the third developing color code to COL[2Q] to COL[3Q-1], and the fourth developing color code to COL [3Q] to COL[4Q-1] (903, . . . 907). For example, for the color mode of blue, the first developing color is M and the second developing color is C, and the third and fourth developing colors have a code X indicating the unnecessary development.

Figure 19:
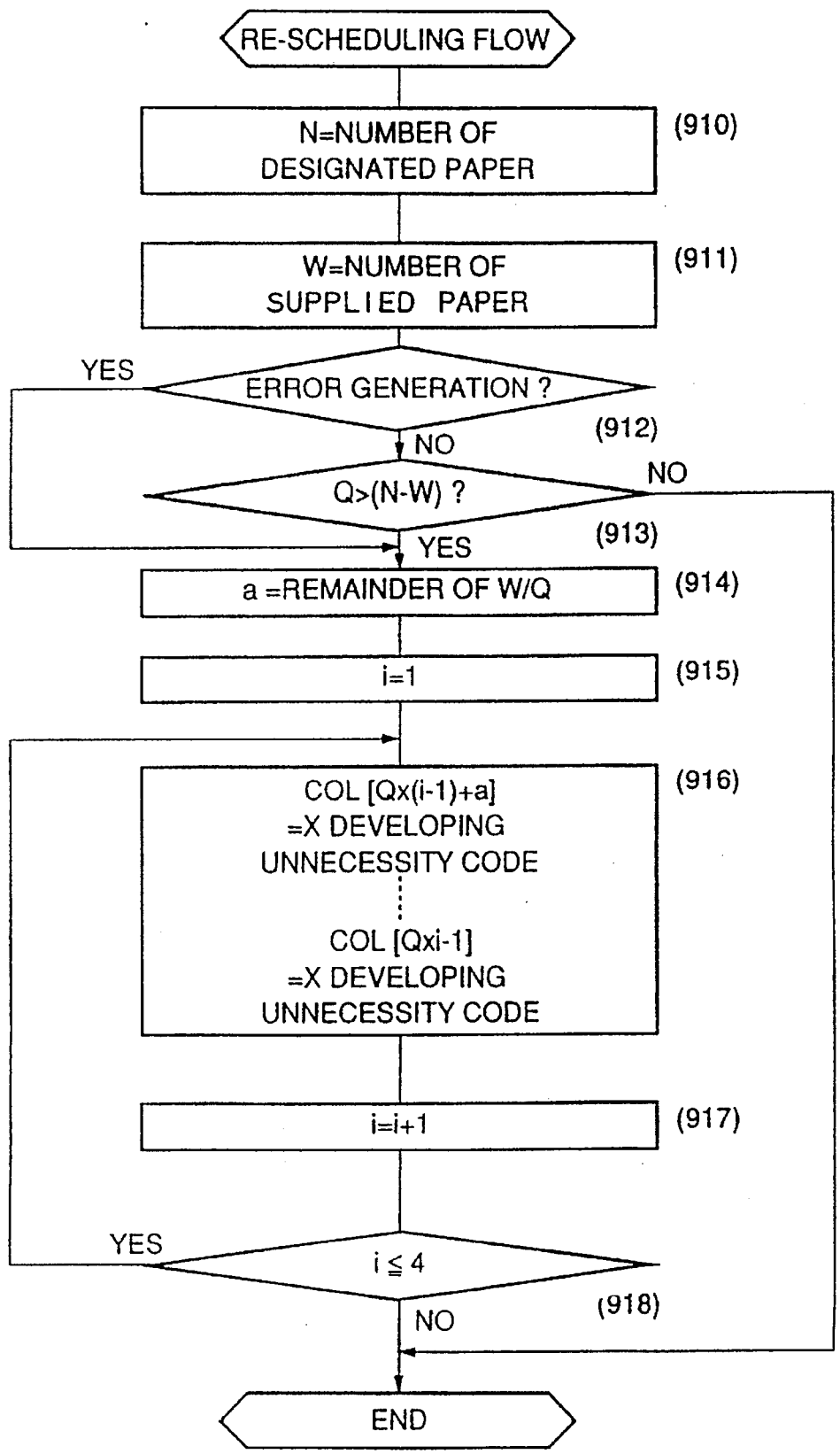
FIG. 19 is a control flowchart.

FIG. 19 shows a rescheduling flow in detail for COL[i] at the step 1035. The designated number of print papers is set to the area N on the RAM (910). The number of supplied papers is set to the area W on the RAM (911). An error check is made (912). If there is an error, the operation proceeds to step 914 because the new supply of paper is impossible. If there is no error, a comparison is made between the number of retention papers Q and the number of remaining papers to be supplied (N-W) (913). When the number of remaining papers (N-W) is greater than the number of retention papers Q, the modification for the schedule is unnecessary, and the operation exits from the flow. Q>(N-W) means the last cycle of the print of N papers in which Q papers are print each time, and if so, the schedule must be modified because there are some papers not requiring the development among Q concurrently retainable papers. For example, in a case of the two-paper retention, the four colors, and the print of three papers, a schedule of COL[i]=(M, M, C, C, Y, Y, Bk, Bk), which has been already set, is therefore modified as COL [i]=(M, X, C, X, Y, X, Bk, X) after the completion of printing the last two papers. Where X is a code indicating the unnecessary development. The generalized procedure for this modification is shown at steps from 914 to 918. First, the remainder of the number of supplied papers W divided by the number of retention papers Q is set to the area a on the RAM (914). The code X is set to the array of COL[a] to COL[Q-1]. In the same way, the code X is set to the arrays of COL[Q+a] to COL[2Q-1], COL[2Q+a] to COL[3Q-1], and COL[3Q+i] to COL[4Q-1] (915, . . . 918). In FIG. 10 of the above embodiment, 1005 is a step for determining the presence or absence of the PSYNC, 1007 is a step for outputting the color data corresponding to COL[i], 1009 is an increment step, 1011 is a step for determining whether or not i is equal to P (previously described), 1015 is a step indicating the completion of the formation of image, 1017 is a step for determining whether or not the number of uncompleted papers is zero, 1025 is a step for developing the color corresponding to COL[i] with its developing unit, 1027, 1029 and 1031 are the same steps as 1009, 1011 and 1013, respectively, and 1033 is a step for determining whether or no the print has been completed.

Third Embodiment

While in the second embodiment, the output sequence of image colors is determined based on the number of retention papers notified from the controller to the color image forming apparatus, in the third embodiment the output sequence of image colors is determined on the color image forming apparatus, and notified to the controller.

A new command used in the third embodiment listed below.

| Command name | Content | Code (HEX) | Parameters |
|---|---|---|---|
| com11 | Output color sequence request command | 90 | None |
| Status name | content | | |
| sts5 | b7　　　　　　b0 c4c4c3c3c2c2c1c1 c8c8c7c7c6c6c5c5 | | |

Com11 is used to request of the color image forming apparatus the sequence of developing colors determined based on the number of retention papers or the sequence of output colors to be output by the controller. Status sts5 is constituted of two bytes, in which an apparatus capable of retaining two papers at maximum is assumed. "ci, i=1, . . . 8" in sts5 indicates a color to be output for the i-th PSYNC signal, in which ci=0 is magenta, ci=1 is cyan, ci=2 is yellow, and ci=3 is black. After the color indicated by "c8" is output for the eighth PSYNC signal, the color indicated by "c1" is output again for the ninth PSYNC signal, and in this way, the colors indicated by "c1" to "c8" are repeatedly output thereafter.

Turning back to FIG. 15, the contents of sts5 corresponding to the combinations of the color mode and the number of retention papers are shown. In the one-color mode for magenta, cyan, yellow and black, the format of "ci" is the same without regards to the number of retention papers, while in the color mode using two or more colors for red, blue, green and four-color, alternate outputs such as "M, Y, M, Y . . . " are made for the one-paper retention, but two consecutive outputs such as "M, M, Y, Y, M, M, Y, Y" are made for the two-paper retention.

Figure 16:
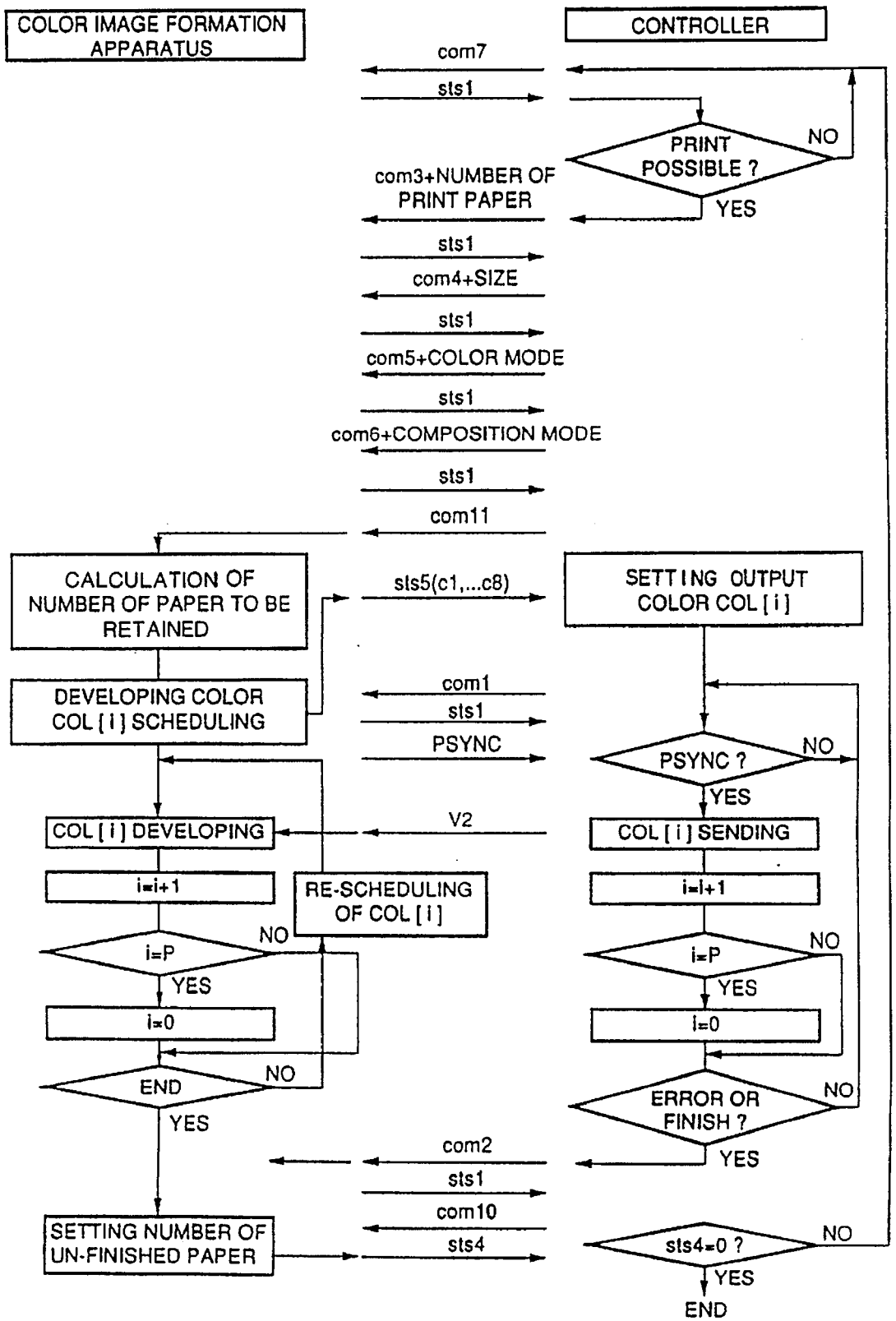
FIG. 16 is an explanation view for the communication protocol.

FIG. 16 shows the communication protocol in the third embodiment.

The explanation for like parts of FIG. 16 to those of FIG. 10 which is a protocol diagram in the second embodiment will be omitted. Comparing FIG. 16 with FIG. 10, the output color sequence request command com11 is used instead of the retention paper number request command com8, and further, sts5 (c1, . . . c8) is output indicating the sequence of output colors based on a result of the scheduling for the developing color COL[i] . That is, it will be found that it is only necessary to receive the sequence of output colors already scheduled, without the necessity of the output color scheduling process on the controller in FIG. 10, and the load on the host computer can be relieved.

Fourth Embodiment

While the sequence of output colors is determined at the beginning of a series of image forming operations in the first, second and third embodiments, the output color is notified from the color image forming apparatus to the controller in the fourth embodiment for each PSYNC signal.

A new command used in the fourth embodiment is listed below.

| Command name | Content | Code (HEX) | Parameters |
| --- | --- | --- | --- |
| com12 | Output color request command | 91 | None |
| Status name | Content | | |
| sts6 | b7           b0<br>0 0 0 0 0 0 X X | | |

Com12 is a command which issued from the host computer to the color image forming apparatus, before the PSYNC signal is output from the color image forming apparatus, in order to request the image color to be output by the host computer for the next PSYNC signal.

Sts6 indicates the output image color with bit0 and bit1, in which 0 is magenta, 1 is cyan, 2 is yellow, and 3 is black.

Figure 17:
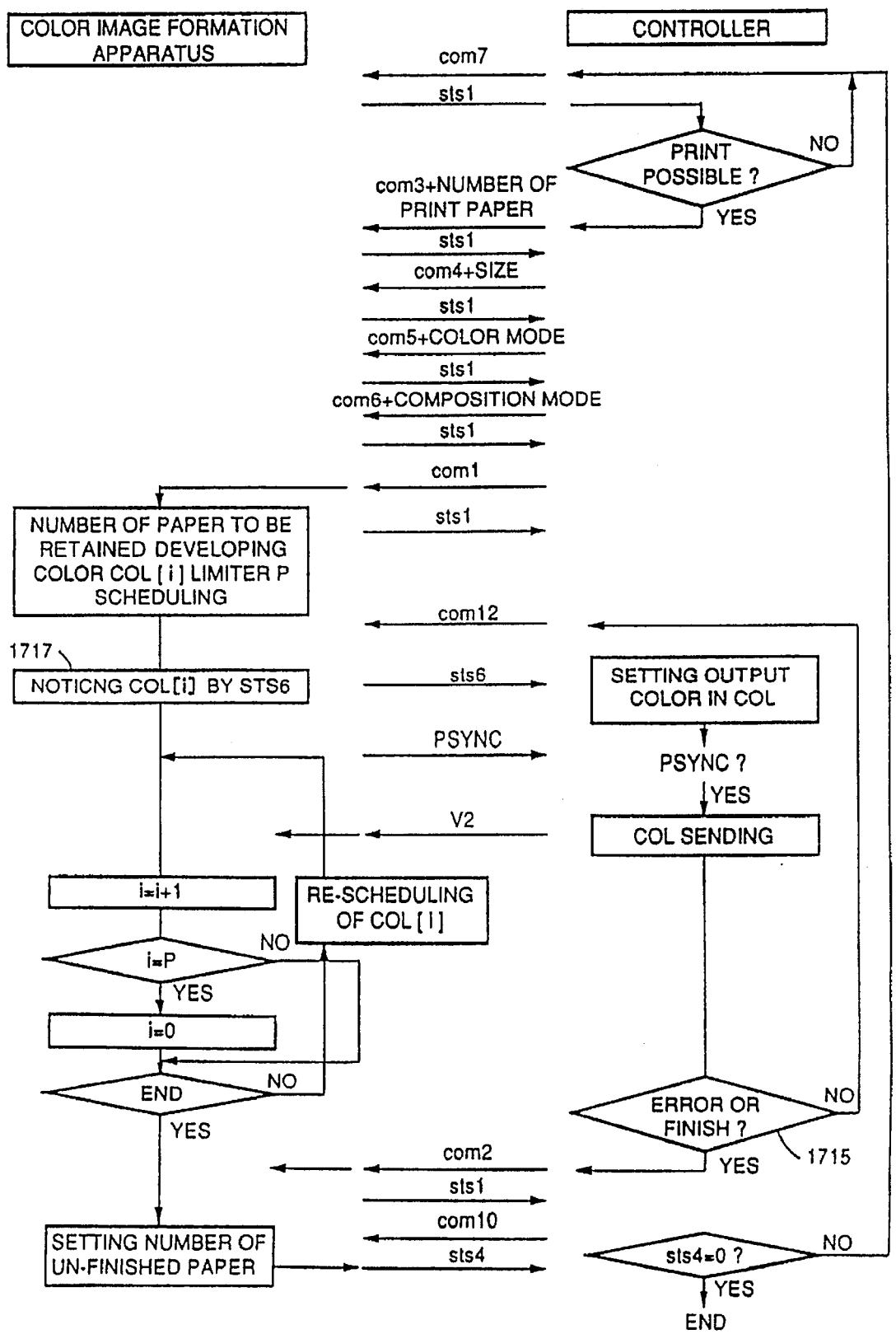
FIG. 17 is an explanation view for the communication protocol.
Figure 18:
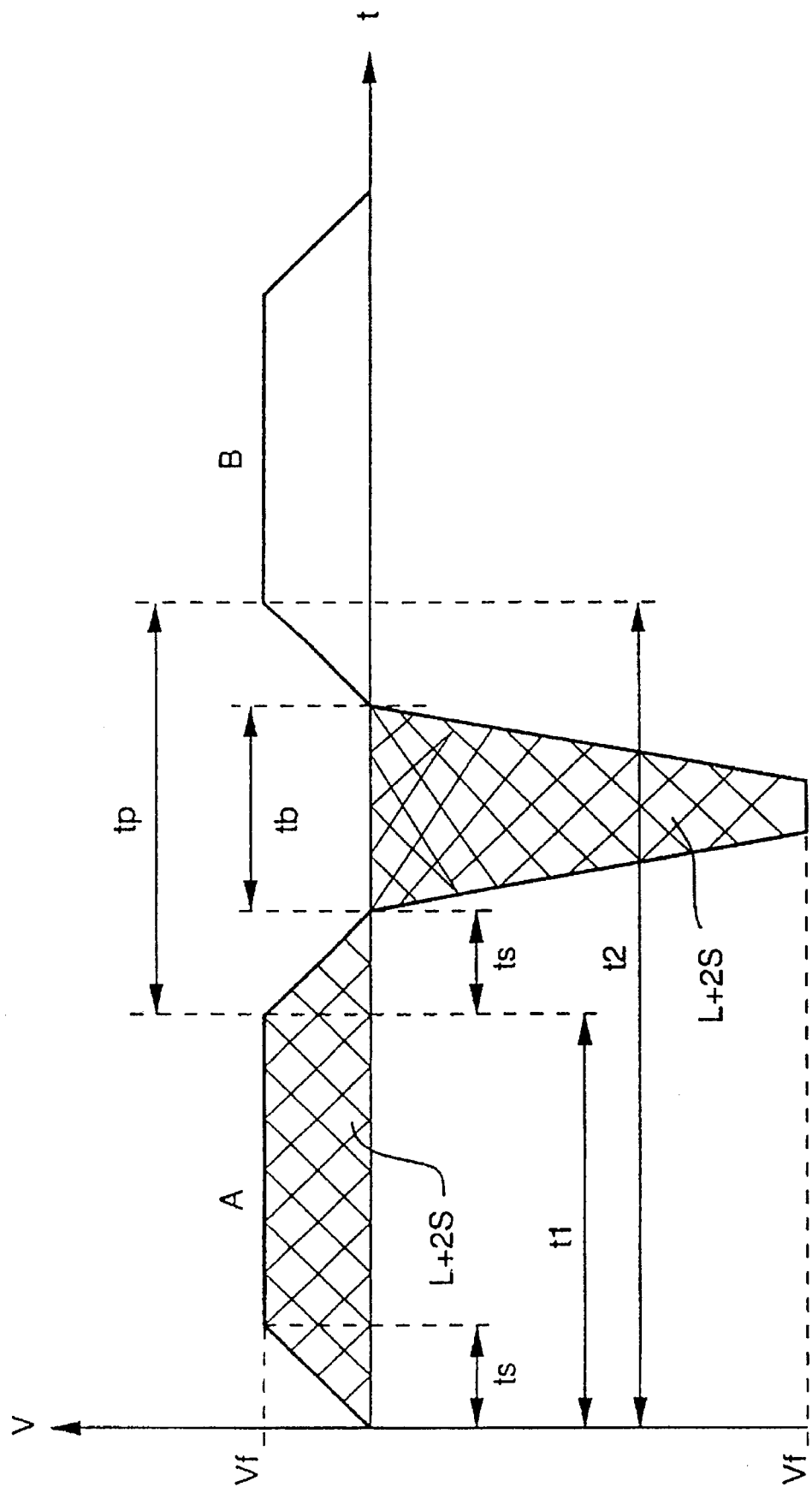
FIG. 18 is a timing chart for the movement of a scanner when reading an original.

FIG. 17 shows the communication protocol when using com12. The explanation for like steps of FIG. 17 to those of FIG. 10 will be omitted. After the image formation mode is indicated by the commands of com3, com4, com5 or com6 as previously described, the color image forming apparatus calculates the number of retainable papers as in the second embodiment, upon receiving the print start command com1 from the host computer, and further performs correspondingly the scheduling of developing color COL[i] and the calculation of the limiter P. At step 1715, the color image forming apparatus notifies the color information COL[i] corresponding to the next PSYNC from the scheduled array COL[i] in terms of sts6, upon the reception of the output color request com12 issued by the host computer (step 1717). The controller stores the output color received with sts6 as COL, and waits for a PSYNC signal. Upon the detection of the PSYNC signal, the image data V2 is output in accordance with the stored output color information COL and then, com12 is sent out again to request the output color for the next PSYNC signal.

As above described, with the provision of means capable of notifying the output color each time, the host computer can print the plural number of retention papers without regards to the intrinsic conditions of the color image forming apparatus and with a simpler control than in the third embodiment.

Fifth Embodiment

While the color image forming apparatus receives the developing color image from the host computer in the first, second and third embodiments, the three-dimensional color space data such as RGB, YIQ and XYZ is received from the host computer in the fifth embodiment, resulting in a lower load on the host computer.

Figure 12B:
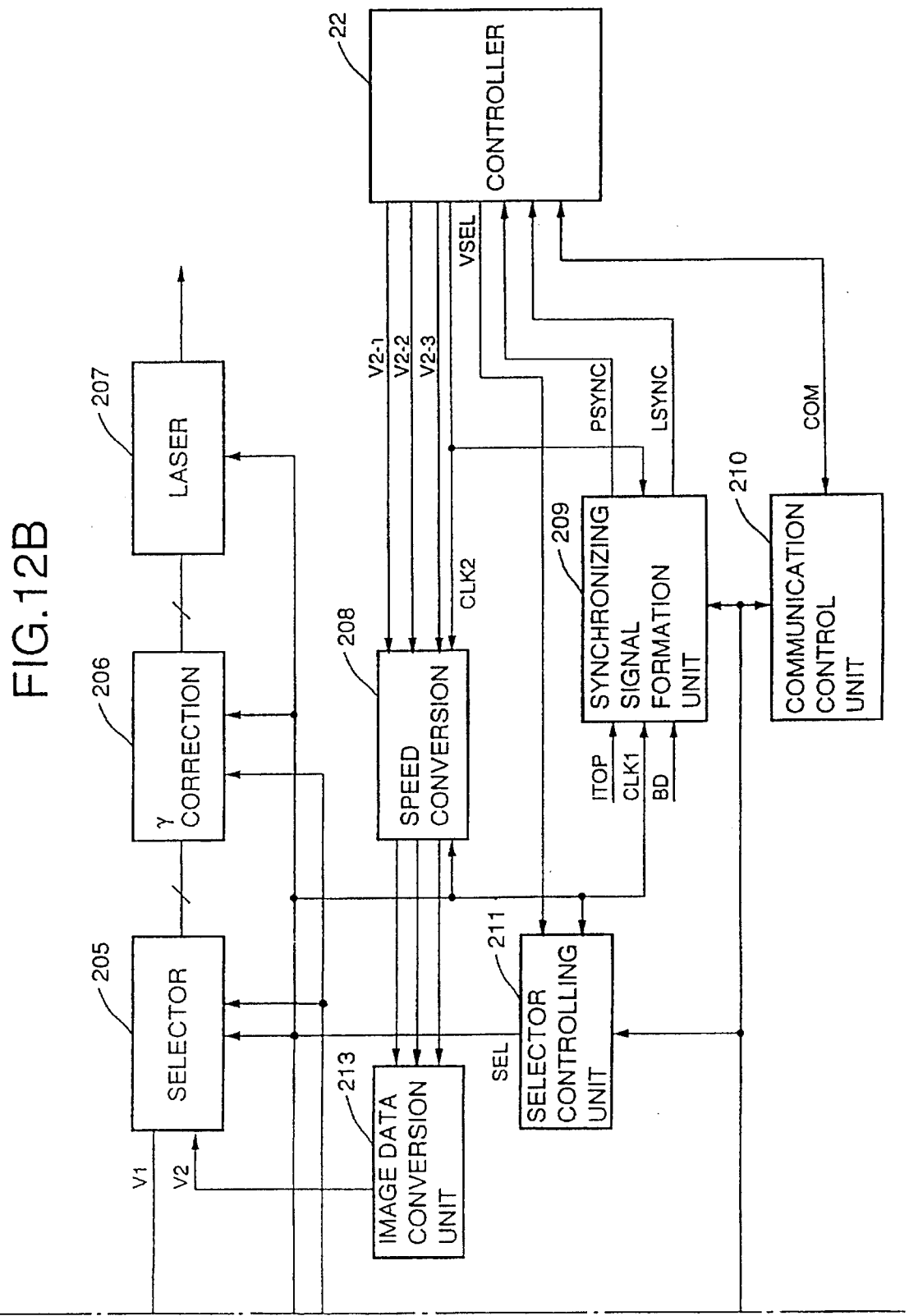
Figure 13:
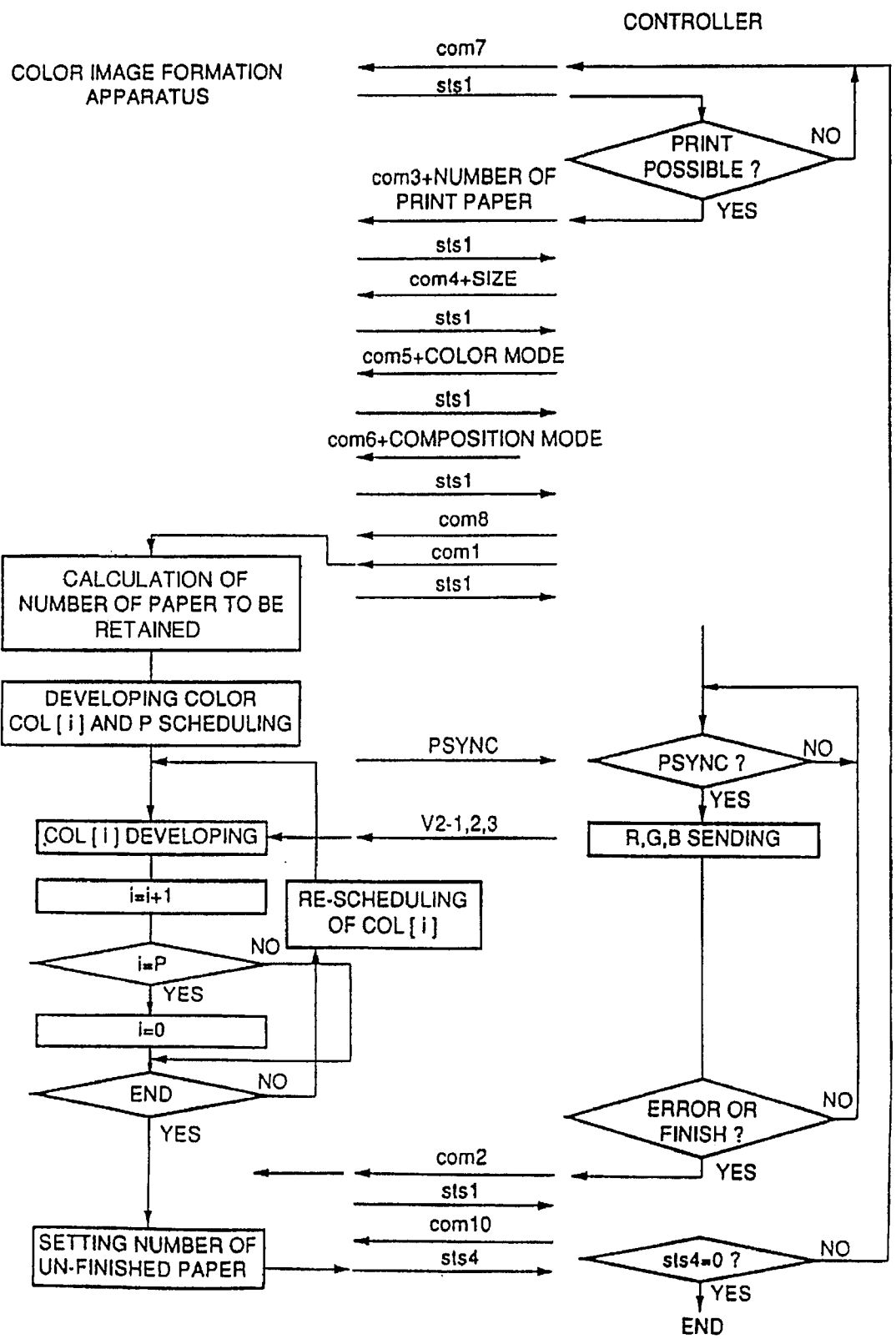
FIG. 13 is an explanation view for the communication protocol.

Turning back to FIG. 12, an image processing circuit block diagram in the fifth embodiment is shown. In FIG. 12, unlike the embodiment of FIG. 1, three lines of image signals V2-1, V2-2 and V2-3 are sent out. V2-1, V2-2 and V2-3 each have eight bits, corresponding to R, G, B or Y, I, Q, and X, Y, Z, respectively. These three lines of image signals are sent to an image data conversion unit 213, after being converted to the same speed as that of the image signal V1 by a speed conversion unit 208. In the image data conversion unit 213, R, G, B image data, for example, are treated with the masking and VCR, and converted to the toner density signals M, C, Y, Bk, one of which is sent out to a selector 205 as an image signal V2. If the color image forming apparatus comprises a feature of converting the image data from the host computer into the toner density signals intrinsic to the color image forming apparatus, the host computer can establish the print for the plural number of retention papers by sending out the same image data for each PSYNC signal. The handshaking in this case is shown in FIG. 13. With the comparison with FIG. 10, it will be understood that the control on the host computer is simpler than that of FIG. 10. The host computer does not need to make the control such as the scheduling of output colors. The color image forming apparatus is unnecessary to be notified of the number of retention papers.

As above described, this embodiment can provide a color image forming apparatus which can print a plurality of retaining papers, with the multiple transfer having a transfer drum capable of retaining a plurality of papers, by comprising a feature of notifying the controller of the number of retention papers, wherein the controller does not need to know any complex combination of plural conditions intrinsic to the apparatus affecting the number of retaining papers.

This embodiment can also provide a color image forming apparatus which can print a plurality of retaining papers, with a simpler control, by comprising a feature of notifying the controller of a sequence of developing colors determined in accordance with the number of retaining papers and the image formation mode.

Further, it is possible to provide a color image forming apparatus which is controllable in a simpler manner by having a feature of notifying the controller of an image data color to be printed for each vertical synchronizing signal of the image signal output.

Further, it is possible to print to a plurality of retaining papers also in a composite print of an image from the controller and an original image by adding the scanning conditions of an image reader as the apparatus proper conditions affecting the number of papers to be retained.

Also, it is possible to provide a color image forming apparatus not requiring any complex control on the controller side in the event of the change in the number of retaining papers as occurs with the paper jamming or paper exhaust, by comprising a feature of sending out a dummy vertical synchronizing signal from the image forming apparatus to the controller.

Also, it is possible to provide a color image forming apparatus which can print a plurality of retaining papers with less load on the host computer, by having a feature of converting the image data from the controller to the toner density signals to be printed.

This embodiment allows printing to for a plurality of retaining papers by defining the information as to the possibility/impossibility of retaining a plurality of papers in the interface protocol between an external device such as a computer and a color image forming apparatus such as a copying apparatus or a printer, thereby eliminating the necessity that the host computer considers the conditions intrinsic to the copy apparatus or the printer, and the complex controls on the host computer side.

Further, it is possible to provide a color image forming apparatus not requiring any complex control of the host computer in the event of the change in the number of retaining papers as occurs with the exhaust of transfer paper during the print, by sending the dummy synchronizing signal to the host computer.

The controller in this embodiment may be a host computer, or in the form of an image data to be sent via the public line.

With this embodiment, an image can be formed efficiently with an image signal from the host computer or external device, with a simpler constitution.

What is claimed is:

1. A color image forming apparatus, comprising:
    retaining means for retaining a plurality of transfer members;
    converting means for converting a color space image signal, which is different from a color space corresponding to a color of an image forming color member and which is input repeatedly according to the number of said transfer members in the image forming apparatus, from an external apparatus into a color space image signal corresponding to the color of the image forming color member; and
    image forming means for sequentially forming an image based on the image signal converted by said converting means on the plurality of transfer members.

2. An apparatus according to claim 1, wherein the color space corresponding to the color of the image forming color member is a color space which consists of at least yellow, magenta and cyan.

3. An apparatus according to claim 1, wherein the image signal input from said external apparatus is a signal of a RGB space.

4. An apparatus according to claim 1, wherein the image signal input from said external apparatus is a signal of a YIQ space or a signal of a XYZ space.

5. An apparatus according to claim 1, further comprising reading means for reading an original image.

6. An apparatus according to claim 5, further comprising synthesizing means for synthesizing the original image and the image signal input from said external apparatus.

7. An apparatus according to claim 1, wherein the image signal to be input from said external apparatus is input repeatedly according to the number of the color of the image forming color member.

8. A color image processing apparatus which transmits an image signal to a color image forming apparatus for retaining a plurality of transfer members and for sequentially forming an image on the plurality of transfer members, comprising:
    receiving means for receiving a synchronization signal generated according to the number of said plurality of transfer members; and
    transmitting means for transmitting a color space image signal which is different from a color space corresponding to a color of a color member of said color image forming apparatus in response to the synchronization signal received by said receiving means to said color image forming apparatus.

9. An apparatus according to claim 8, wherein said receiving means receives the sync repeatedly according to the number of a color of the color member.

10. An apparatus according to claim 8, wherein the color space corresponding to a color of the color member is a color space which includes at least yellow, magenta and cyan.

11. An apparatus according to claim 8, wherein the image signal to be transmitted is a signal of a RGB space.

12. An apparatus according to claim 8, wherein the image signal input from said external apparatus is a signal of a YIQ space or a signal of a XYZ space.

13. An image processing system, comprising:
    a color image forming device, said color image forming device including:
        retaining means for retaining a plurality of transfer members;
        converting means for converting an image signal of a predetermined color space which is input repeatedly according to the number of said transfer members of said color image forming device from a color image processing device into a color space image signal corresponding to a color of an image forming color member of the color image forming device; and
        image forming means for sequentially forming an image based on the image signal converted by said converting means on the plurality of transfer members; and
    wherein said color image processing device includes:
        receiving means for receiving a synchronization signal generated according to the number of said transfer members retained by said retaining means from said color image forming device and transmitting means for transmitting an image signal of a color space different from a color space corresponding to a color of a color member of said color image forming device in response to the synchronization signal received by said receiving means to said color image forming device.

14. A color image forming apparatus, comprising:
    retaining means for retaining a plurality of formed images;
    converting means for converting a color space image signal, which is different from a color space corresponding to a color of an image forming color member and which is input repeatedly according to the number of said formed images in the image forming apparatus from an external apparatus, into a color space image signal corresponding to the color of the image forming color member; and
    image forming means for sequentially forming an image as said formed images based on the image signal converted by said converting means.

15. An apparatus according to claim 14, wherein the color space corresponding to the color of the image forming color member is a color space which consists of at least yellow, magenta and cyan.

16. An apparatus according to claim 14, wherein the image signal input from said external apparatus is a signal of an RGB space.

17. An apparatus according to claim 14, wherein the image signal input from said external apparatus is a signal of a YIQ space or a signal of an XYZ space.

18. An apparatus according to claim 14, further comprising reading means for reading an original image.

19. An apparatus according to claim 18, further comprising synthesizing means for synthesizing the original image and the image signal input from said external apparatus.

20. An apparatus according to claim 14, wherein the image signal to be input from said external apparatus is input repeatedly according to the number of the color of the image forming color member.

21. A color image processing apparatus which transmits an image signal to a color image forming apparatus for retaining a plurality of formed image and for sequentially forming an image as said formed images, comprising:
receiving means for receiving a synchronization signal generated according to the number of said plurality of formed images; and
transmitting means for transmitting a color space image signal which is different from a color space corresponding to a color of a color member of said color image forming apparatus in response to the synchronization signal received by said receiving means to said color image forming apparatus.

22. An apparatus according to claim 21, wherein said receiving means receives the synchronization signal repeatedly according to the number of a color of the color member.

23. An apparatus according to claim 21, wherein the color space corresponding to a color of the color member is a color space which includes at least yellow, magenta and cyan.

24. An apparatus according to claim 21, wherein the image signal to be transmitted is a signal of an RGB space.

25. An apparatus according to claim 21, wherein the image signal input from said external apparatus is a signal of a YIQ space or a signal of an XYZ space.

26. An image processing system, comprising:
a color image forming device, said color image forming device including:
retaining means for retaining a plurality of formed images;
converting means for converting an image signal of a predetermined color space, which is input repeatedly according to the number of said formed images of said color image forming device from a color image processing device, into a color space image signal corresponding to a color of an image forming color member of the color image forming device; and
image forming means for sequentially forming an image as said formed images based on the image signal converted by said converting means; and
wherein said color image processing device includes:
receiving means for receiving a synchronization signal generated according to a number of said formed images retained by said retaining means from said color image forming device and transmitting means for transmitting an image signal of a color space different from a color space corresponding to a color of a color member of said color image forming device in response to the synchronization signal received by said receiving means to said color image forming device.

27. A color image forming apparatus, comprising:
retaining means for retaining a plurality of formed images;
converting means for converting a color space image signal, which is different from a color space corresponding to a color of an image forming color member from an external apparatus, into a color space image signal corresponding to the color of the image forming color member; and
image forming means for sequentially forming an image as said formed images based on the image signal converted by said converting means.

28. An apparatus according to claim 27, wherein the color space corresponding to the color of the image forming color member is a color space which consists of at least yellow, magenta and cyan.

29. An apparatus according to claim 27, wherein the image signal input from said external apparatus is a signal of an RGB space.

30. An apparatus according to claim 27, wherein the image signal input from said external apparatus is a signal of a YIQ space or a signal of an XYZ space.

31. An apparatus according to claim 27, further comprising reading means for reading an original image.

32. An apparatus according to claim 31, further comprising synthesizing means for synthesizing the original image and the image signal input from said external apparatus.

33. An apparatus according to claim 27, wherein the image signal to be input from said external apparatus is input repeatedly according to the number of the color of the image forming color member.

34. A color image processing apparatus which has retaining means transmits an image signal to a color image forming apparatus for retaining a plurality of formed images and for sequentially forming an image as said formed images, comprising:
receiving means for receiving a synchronization signal from said color image forming apparatus; and
transmitting means for transmitting a color space image signal which is different from a color space corresponding to a color of a color member of said color image forming apparatus in response to the synchronization signal received by said receiving means to said color image forming apparatus.

35. An apparatus according to claim 34, wherein said receiving means receives the synchronization signal repeatedly according to the number of a color of the color member.

36. An apparatus according to claim 34, wherein the color space corresponding to a color of the color member is a color space which includes at least yellow, magenta and cyan.

37. An apparatus according to claim 34, wherein the image signal to be transmitted is a signal of an RGB space.

38. An apparatus according to claim 35, wherein the image signal input from said external apparatus is a signal of a YIQ space or a signal of an XYZ space.

39. An image processing system, comprising:
a color image forming device, said color image forming device including:
retaining means for retaining a plurality of formed images;
converting means for converting an image signal of a predetermined color space which is input into a color space image signal corresponding to a color of an image forming color member of the color image forming device; and
image forming means for sequentially forming an image as said formed images based on the image signal converted by said converting means; and wherein said color image processing device includes:
receiving means for receiving a synchronization signal from said color image forming device and transmitting means for transmitting an image signal of a color space different from a color space corresponding to a color of a color member of said color image forming device in response to the synchronization signal received by said receiving means to said color image forming device.

* * * * *

UNITED STATES PATENT AND TRADEMARK OFFICE
CERTIFICATE OF CORRECTION

PATENT NO. : 5,625,445

DATED : April 29, 1997

INVENTORS : Masanori Yamada

Page 1 of 4

It is certified that error appears in the above-identified patent and that said Letters Patent is hereby corrected as shown below:

COLUMN 1

Line 22, "on" should read --onto--.

COLUMN 2

Line 17, "retenting" should read --retaining--; and
   Line 52, "holding" should read --holding means--.

COLUMN 3

Line 7, "adsorbing" should read --retaining--;
   Line 21, "adsorption" should read --retention--; and
   Line 42, "a" should be deleted.

COLUMN 4

Line 11, "an" should be deleted; and
   Line 19, "conveying." should read --conveying--.

COLUMN 5

Line 14, "an" should be deleted.

COLUMN 6

Line 9, "coral" should read --com1--; and
   Line 36, "in" should read --by--.

UNITED STATES PATENT AND TRADEMARK OFFICE
CERTIFICATE OF CORRECTION

PATENT NO. : 5,625,445

DATED : April 29, 1997

INVENTORS : Masanori Yamada

It is certified that error appears in the above-identified patent and that said Letters Patent is hereby corrected as shown below:

COLUMN 7

Line 12, "print In" should read --print.  In--.

COLUMN 8

Line 20, "com8" should read --Com8--;
Line 21, "sts2=0" should read --Sts2=0--;
Line 31, "com9" should read --is com9--; and
Line 55, "such" should read --such is--.

COLUMN 9

Line 28, "is-set" should read --is set--; and
Line 65, "are print" should read --are printed--.

COLUMN 10

Line 26, "no" should read --not--; and
Line 53, "Status" should read --Status code--.

COLUMN 12

Line 67, "retaining" should read --retained--.

COLUMN 13

Line 10, "for" should be deleted;
Line 11, "retaining" should be --retained--;
Line 35, "a color space" should read --an--;
Line 36, "signal," should read --signal of a color space,--;

UNITED STATES PATENT AND TRADEMARK OFFICE
CERTIFICATE OF CORRECTION

PATENT NO. : 5,625,445

DATED : April 29, 1997

INVENTORS : Masanori Yamada

It is certified that error appears in the above-identified patent and that said Letters Patent is hereby corrected as shown below:

COLUMN 13 (Cont.)

Line 40, "a color space" should read --an--; and
  Line 41, "signal" should read --signal of a color space--.

COLUMN 14

Line 7, "a color space" should read --an--; and
  Line 8, "signal" should read --signal of a color space--;
  Line 33, "a color space" should read --an-- and "signal" should read --signal of a color space--;
  Line 55, "a color space" should read --an--;
  Line 56, "signal," should read --signal of a color space--;
  Line 59, "a color space" should read --an--; and
  Line 60, "signal" should read --signal of a color space--.

COLUMN 15

Line 25, "a color space" should read --an--;
  Line 26, "signal" should read --signal of a color space--; and
  Line 51, "a color space" should read --an-- and "signal" should read --signal of a color space--.

UNITED STATES PATENT AND TRADEMARK OFFICE
CERTIFICATE OF CORRECTION

PATENT NO. : 5,625,445

DATED : April 29, 1997

INVENTORS : Masanori Yamada

It is certified that error appears in the above-identified patent and that said Letters Patent is hereby corrected as shown below:

COLUMN 16

```
Line 4,  "a color space" should read --an--;
Line 5,  "signal," should read --signal of a color
 space--;
Line 7,  "a color space" should read --an--;
Line 8,  "signal" should read --signal of a color
 space--;
Line 30, "has retain-" should be deleted;
Line 31, "ing means" should be deleted;
Line 37, "a color space" should read --an--;
Line 38, "signal" should read --signal of a color
 space--;
Line 51, "claim 35" should read --claim 34--;
Line 60, "a color" should be deleted; and
Line 61, "space" should read --an-- and "signal" should
 read --signal of a color space--.
```

Signed and Sealed this

Eleventh Day of November, 1997

*Attest:*

BRUCE LEHMAN

*Attesting Officer*  Commissioner of Patents and Trademarks